US012117809B2

United States Patent
Enomoto et al.

(10) Patent No.: US 12,117,809 B2
(45) Date of Patent: Oct. 15, 2024

(54) PLANNING DEVICE, PLANNING METHOD, AND PLANNING PROGRAM

(71) Applicant: Hitachi, Ltd., Tokyo (JP)

(72) Inventors: Atsuko Enomoto, Tokyo (JP); Daiki Kajita, Tokyo (JP); Takahiro Nakano, Tokyo (JP); Takaharu Matsui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 379 days.

(21) Appl. No.: 17/405,070

(22) Filed: Aug. 18, 2021

(65) Prior Publication Data
US 2022/0075355 A1    Mar. 10, 2022

(30) Foreign Application Priority Data
Sep. 7, 2020    (JP) .................. 2020-149595

(51) Int. Cl.
*G05B 19/418*    (2006.01)
*B25J 9/16*    (2006.01)
(Continued)

(52) U.S. Cl.
CPC ...... *G05B 19/41865* (2013.01); *B25J 9/1661* (2013.01); *G06F 16/24* (2019.01); *G06F 16/283* (2019.01); *G05B 2219/31053* (2013.01)

(58) Field of Classification Search
None
See application file for complete search history.

(56) References Cited

U.S. PATENT DOCUMENTS 5,980,084 A * 11/1999 Jones ............... G05B 19/41805
                                                        700/95
6,415,204 B1 * 7/2002 Hirabayashi ......... B23P 21/004
                                                        29/430
(Continued)

FOREIGN PATENT DOCUMENTS

JP    2006-26757 A    2/2006
JP    2012-14569 A    1/2012
JP    2018005651 A *  1/2018

OTHER PUBLICATIONS

Simonic, "Autonomous Learning of Assembly Tasks from the Corresponding Disassembly Tasks", Oct. 2019, IEEE-RAS 19th International Conference on Humanoid Robots, pp. 1-7 (Year: 2019).*

(Continued)

*Primary Examiner* — David Earl Ogg
(74) *Attorney, Agent, or Firm* — MATTINGLY & MALUR, PC

(57) ABSTRACT

In an arrangement design of a robot cell and of robot work, a planning device searches an arrangement graph, that shows candidates for relative positions and orientations between a robot and a fixture; searches a disassembly task sequence, of disassembly tasks that are operations of the robot for disassembling components from the assembly in an arrangement of the relative positions and orientations between the robot and the fixture, and searches for, based on a point sequence of positioning relay points of the robot, a trajectory in which the robot disassembles the components from the assembly; and generates assembly tasks formed of a point sequence obtained by reversing the point sequence of the relay points, an assembly trajectory of the robot which is reverse to a disassembly trajectory formed of interpolation points between the point sequences, and an assembly (Continued)

sequence, which is a reverse order of the disassembly task sequence.

8 Claims, 15 Drawing Sheets

(51) Int. Cl.
  *G06F 16/24* (2019.01)
  *G06F 16/28* (2019.01)

(56) References Cited

U.S. PATENT DOCUMENTS

| 10,906,193 | B2* | 2/2021 | Hashimoto | B25J 9/0087 |
| 2015/0293525 | A1* | 10/2015 | Yamamoto | G05B 19/4097 |
| | | | | 702/182 |
| 2019/0275675 | A1* | 9/2019 | Seno | G05B 19/02 |
| 2020/0147794 | A1* | 5/2020 | Kerrick | G05B 19/4097 |

OTHER PUBLICATIONS

Burkardt, "STLA Files ASCII stereolithography files", Jul. 2014, https://people.sc.fsu.edu/~jburkardt/data/stla/stla.html, pp. 1-2 (Year: 2014).*

* cited by examiner

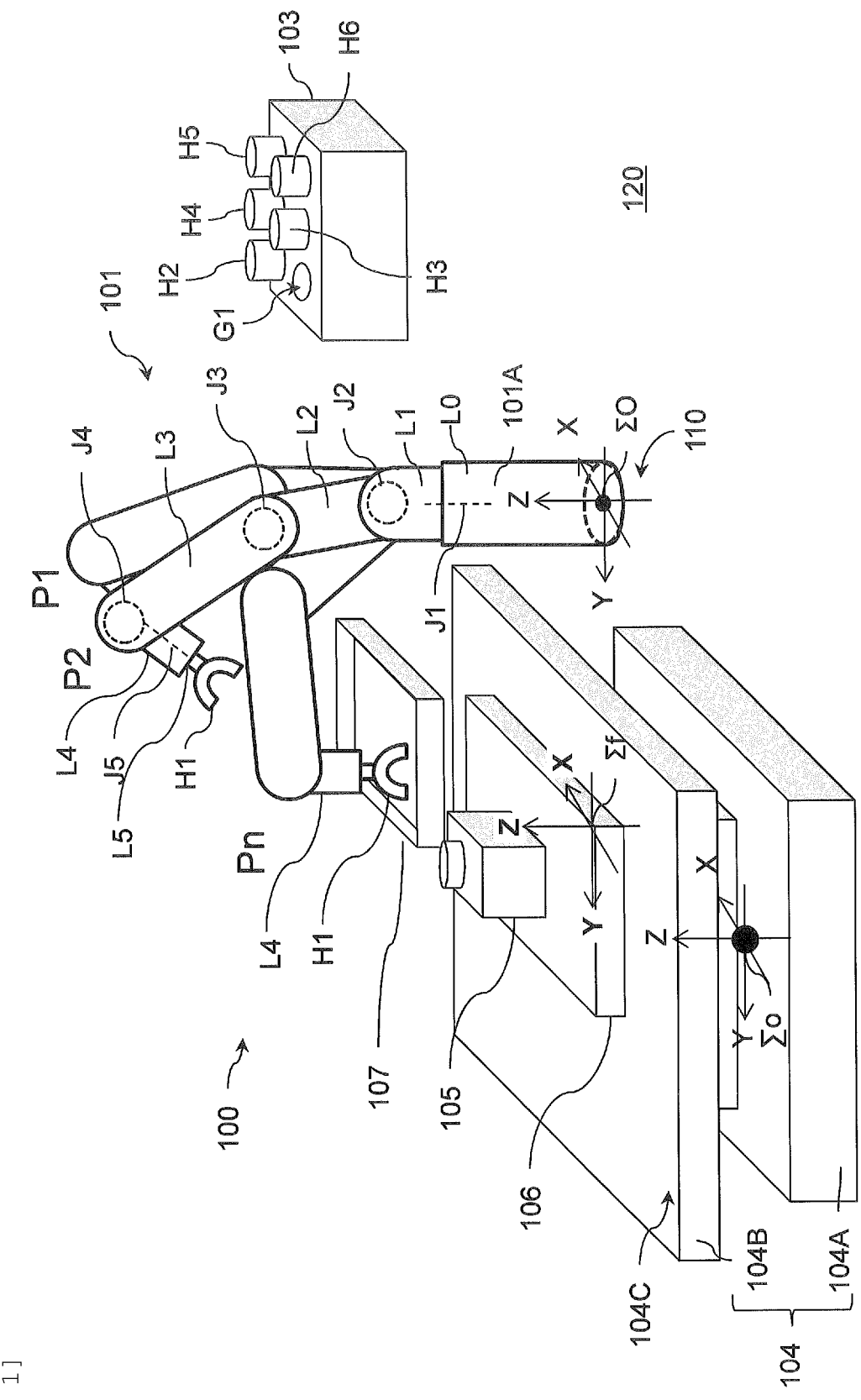
[FIG. 1]

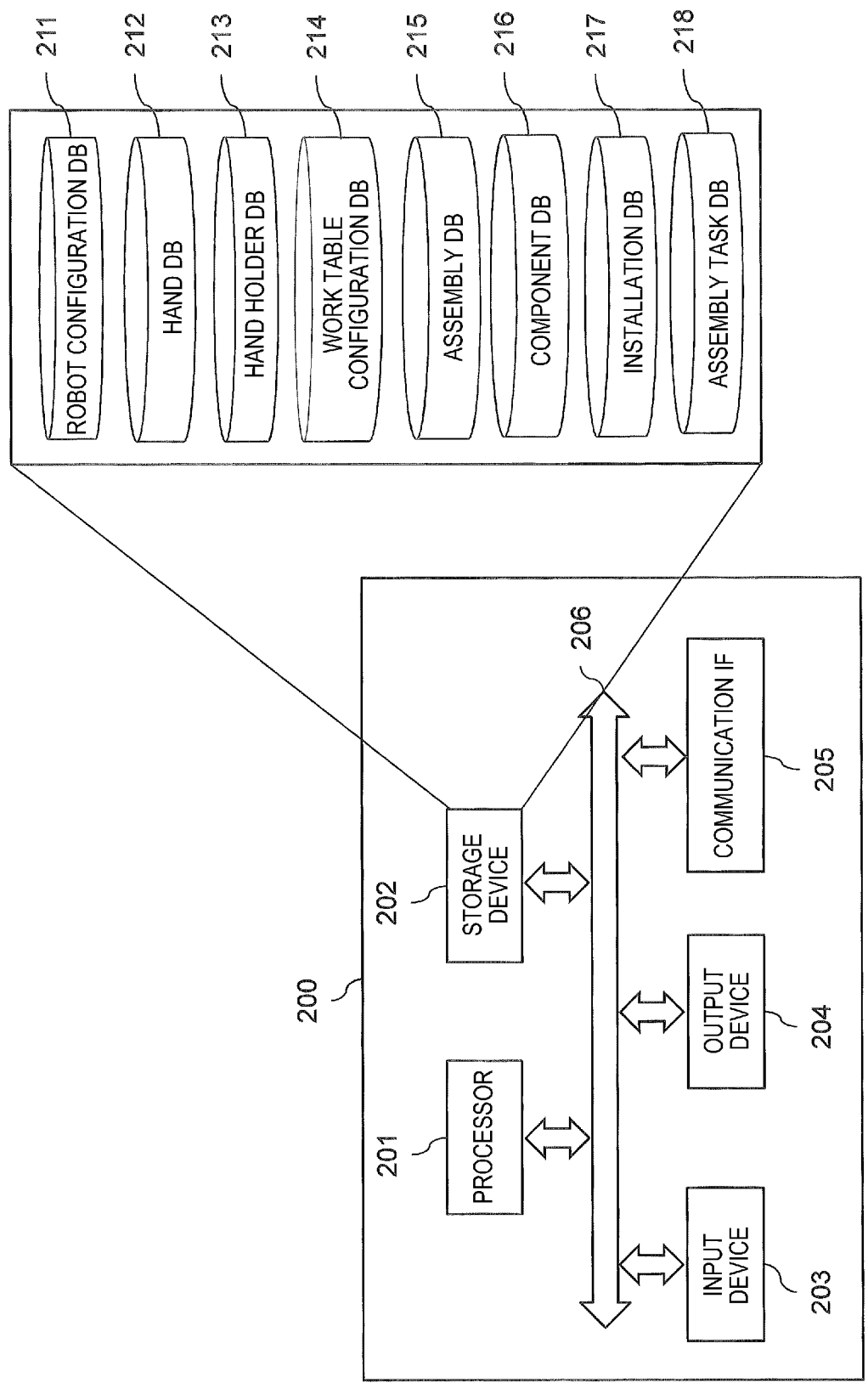
[FIG. 2]

[FIG. 3]
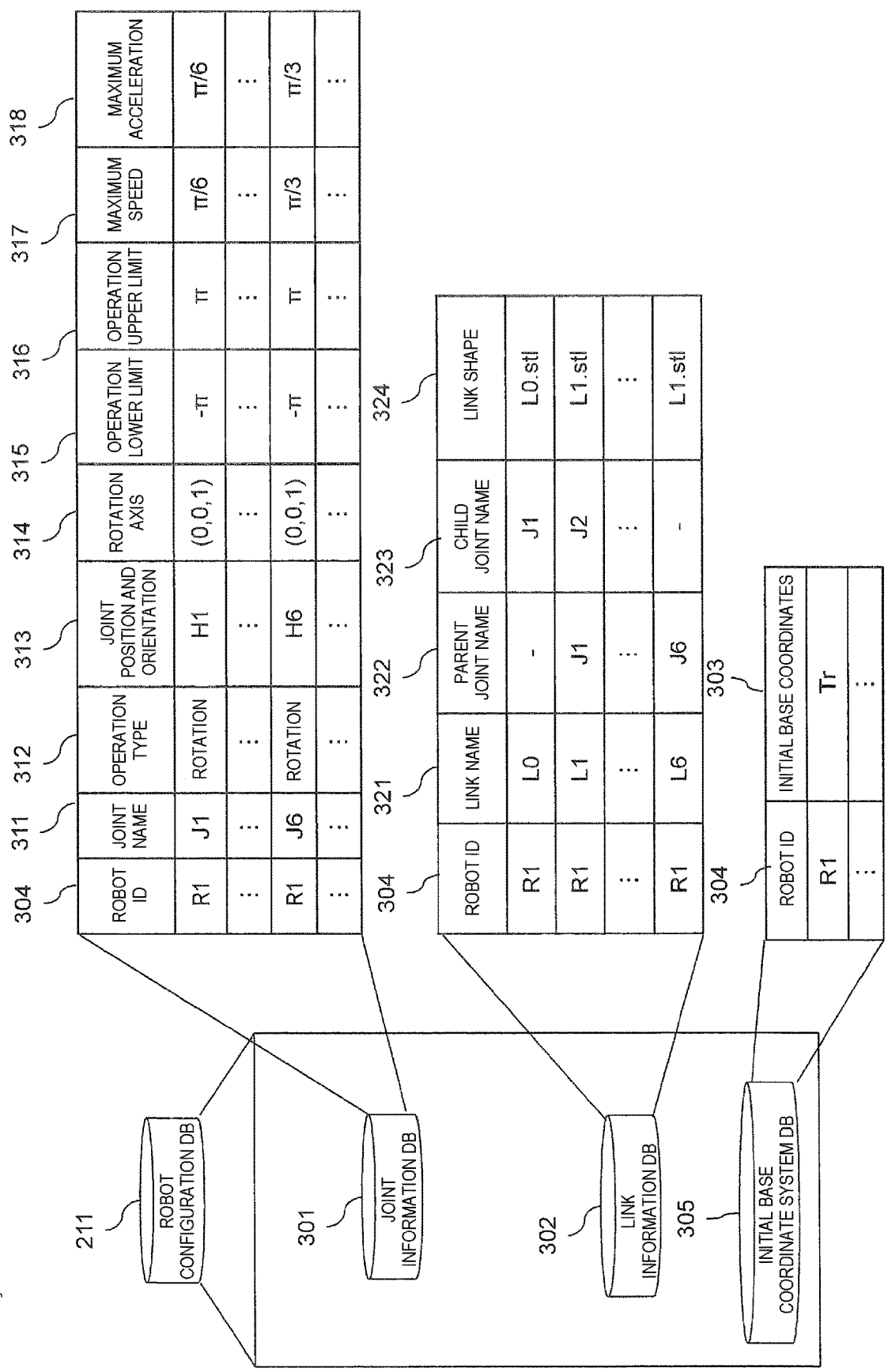

[FIG. 4]
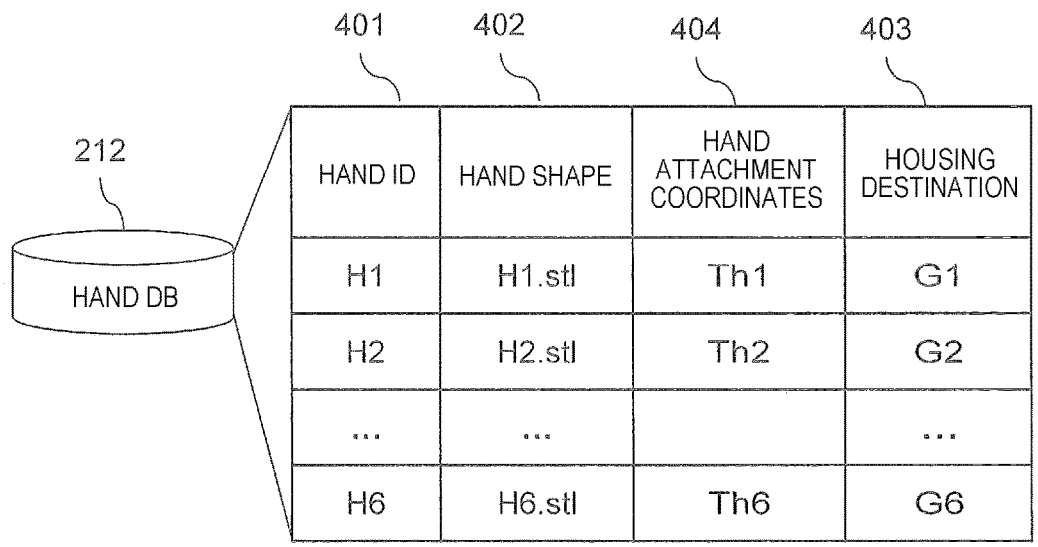
[FIG. 5]
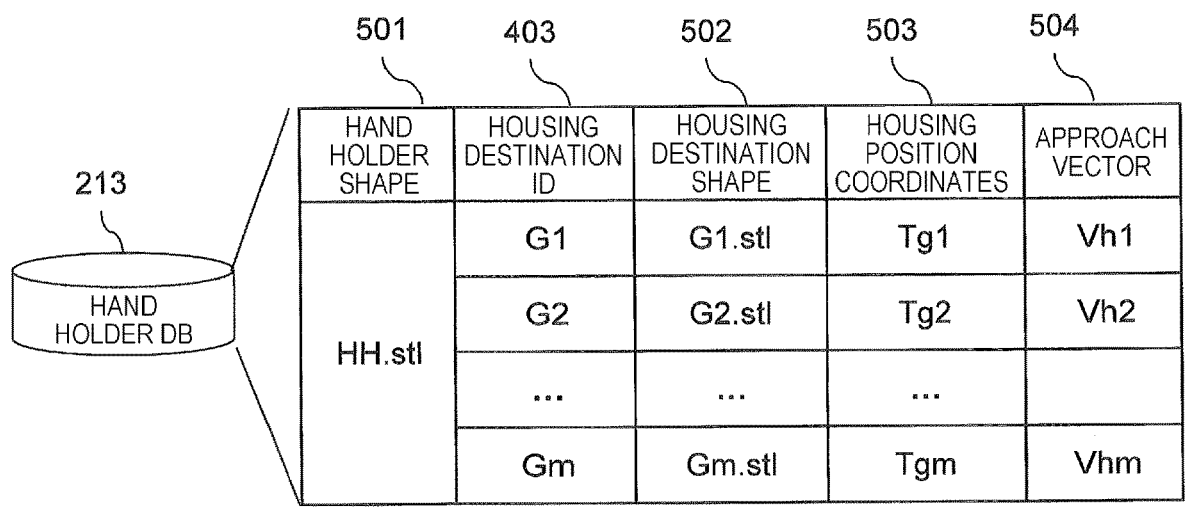

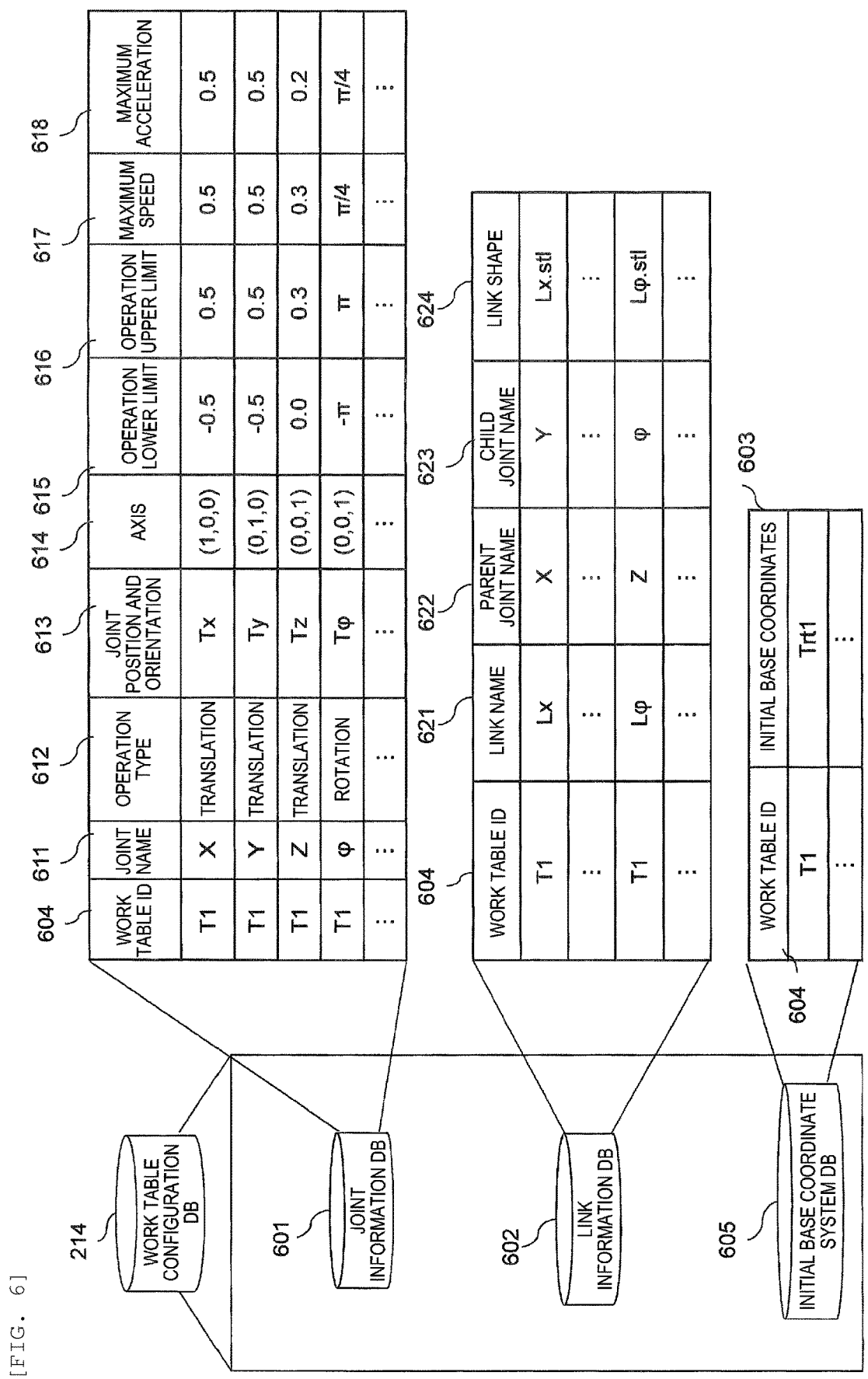
[FIG. 6]

[FIG. 7]

| ASSEMBLY ID (701) | COMPONENT ID (702) | BASE COMPONENT ID (703) |
|---|---|---|
| A1 | a1_1,a1_2,a1_3,... | a1_1 |
| A2 | a2_1,a2_2,a2_3,... | a2_1 |
| A3 | a3_1,a3_2,a3_3,... | a2_1 |
| ... | ... | ... |

215 ASSEMBLY DB

[FIG. 8]

| ASSEMBLY ID (800) | COMPONENT ID (801) | COMPONENT SHAPE (802) | COMPONENT ASSEMBLY COORDINATES (803) | COMPONENT TRAY ID (804) | AVAILABLE HAND ID (805) | GRIP COORDINATES (806) |
|---|---|---|---|---|---|---|
| A1 | a1_1 | a1_1.stl | Ta1_1 | Tr1_1 | H1 | Ha1_1 |
| ... | a1_2 | a1_2.stl | Ta1_2 | Tr1_2 | H1 | Ha1_2 |
| ... | a1_3 | a1_3.stl | Ta1_3 | Tr1_3 | H2 | Ha1_3 |
| ... | ... | ... | ... | ... | ... | ... |

216 COMPONENT DB

[FIG. 9]

| INSTALLATION ID (901) | INSTALLATION SHAPE (902) | BASE COORDINATES (903) | RELATIVE ID (904) | RELATIVE COORDINATES (905) | APPROACH VECTOR (906) |
|---|---|---|---|---|---|
| Fixture_1 | Fixture_1.stl | Tf | Fb | Hfb | Vf1 |
| Tray_1 | Tray_1.stl | Tp | Tr1_1 | Htr1 | V_1 |
| | | | Tr1_2 | Htr2 | V_2 |
| | | | ... | ... | ... |

217 INSTALLATION DB

[FIG. 10]
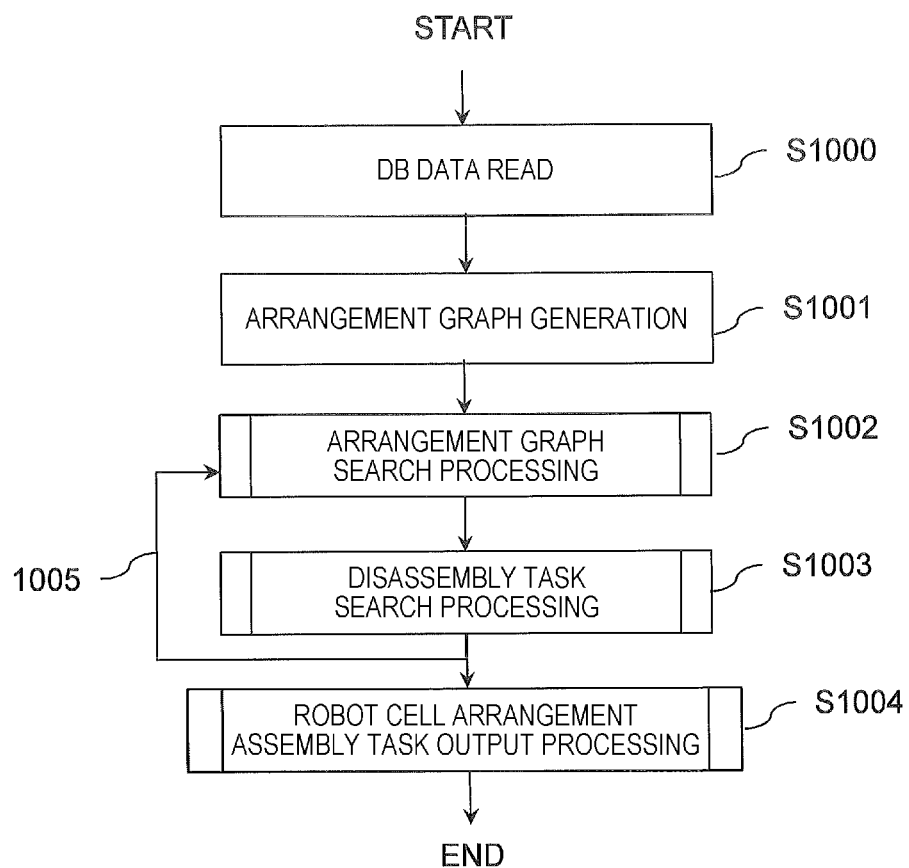

[FIG. 11]
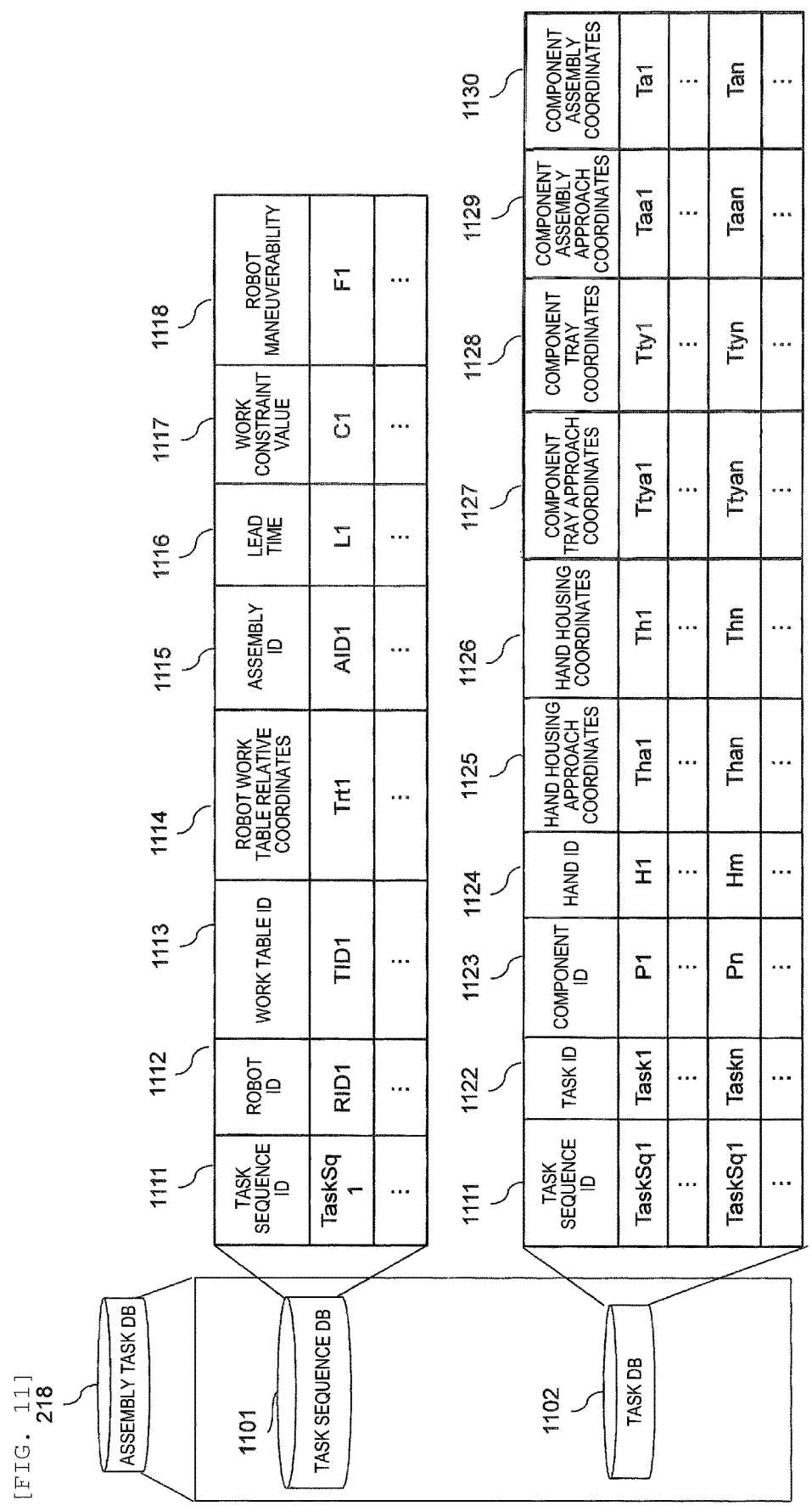

[FIG. 12]
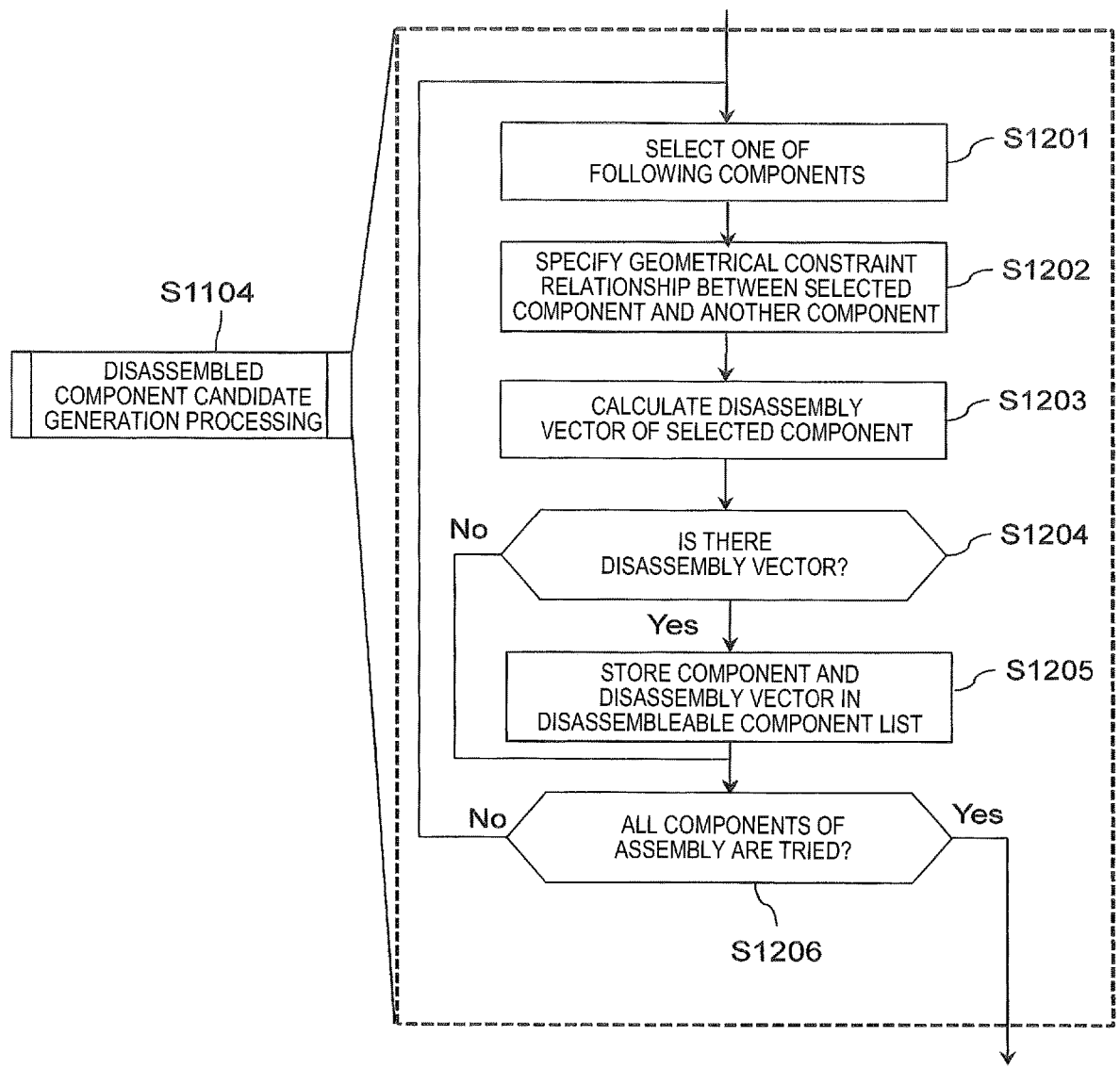

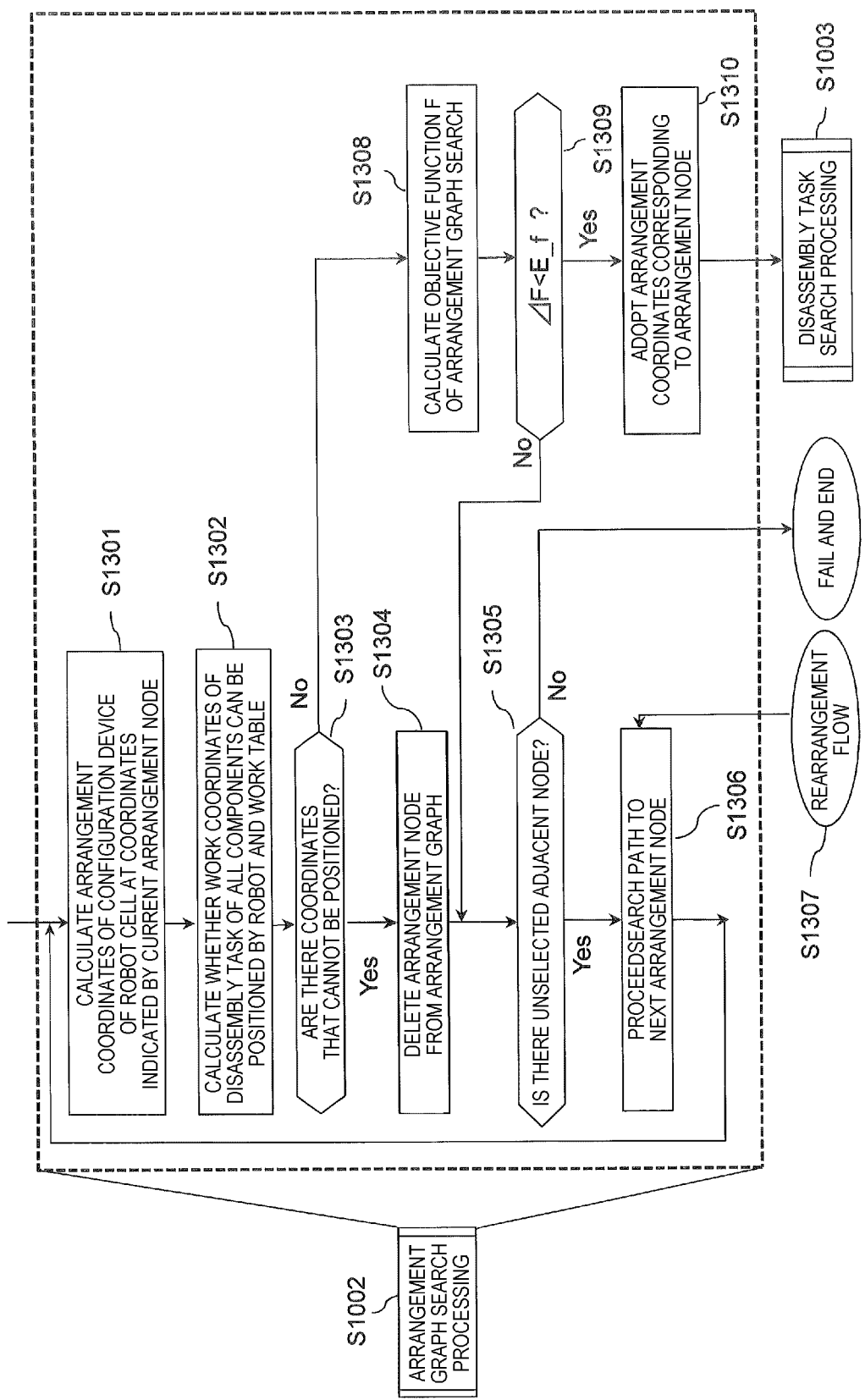
[FIG. 13]

[FIG. 14]
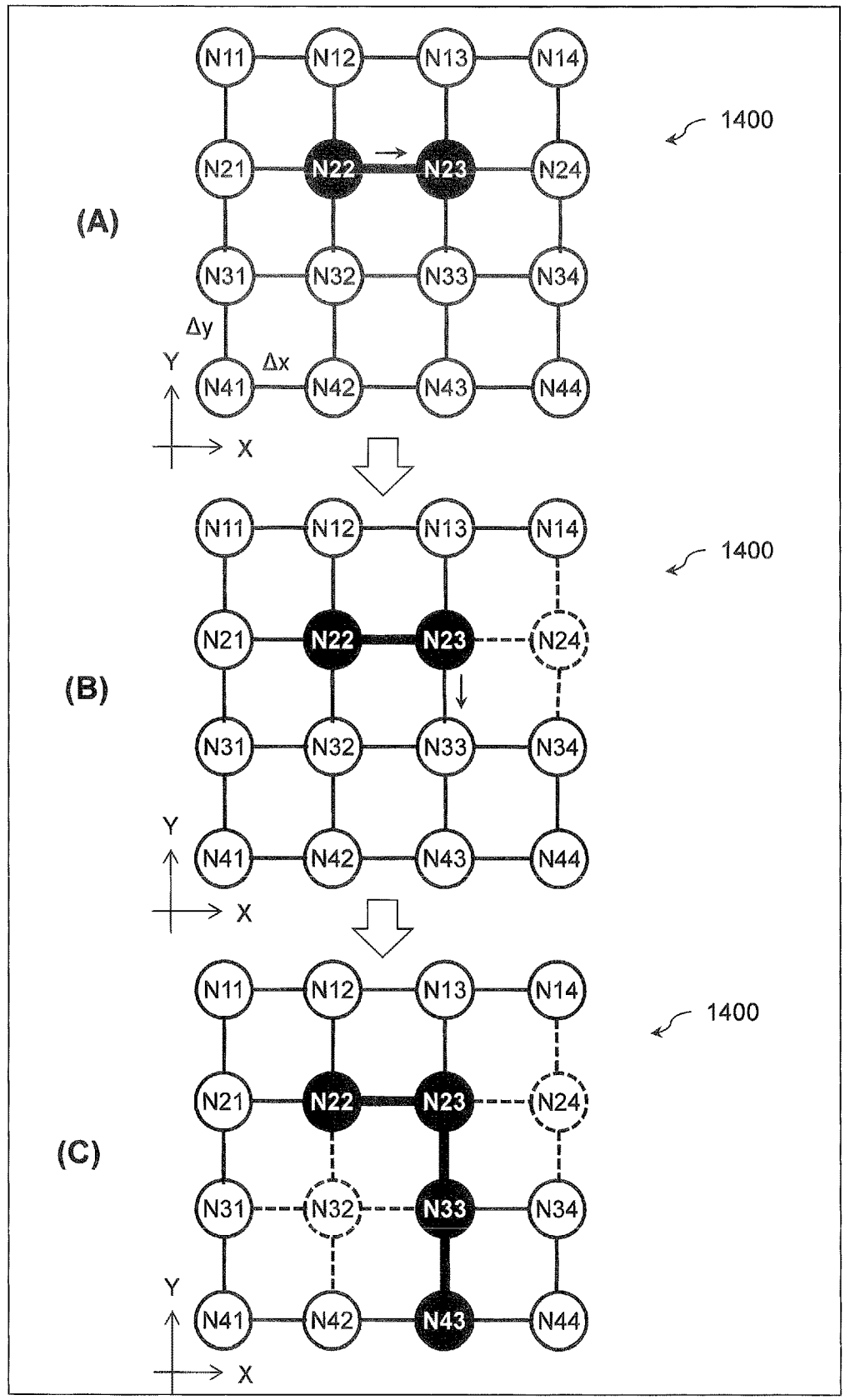

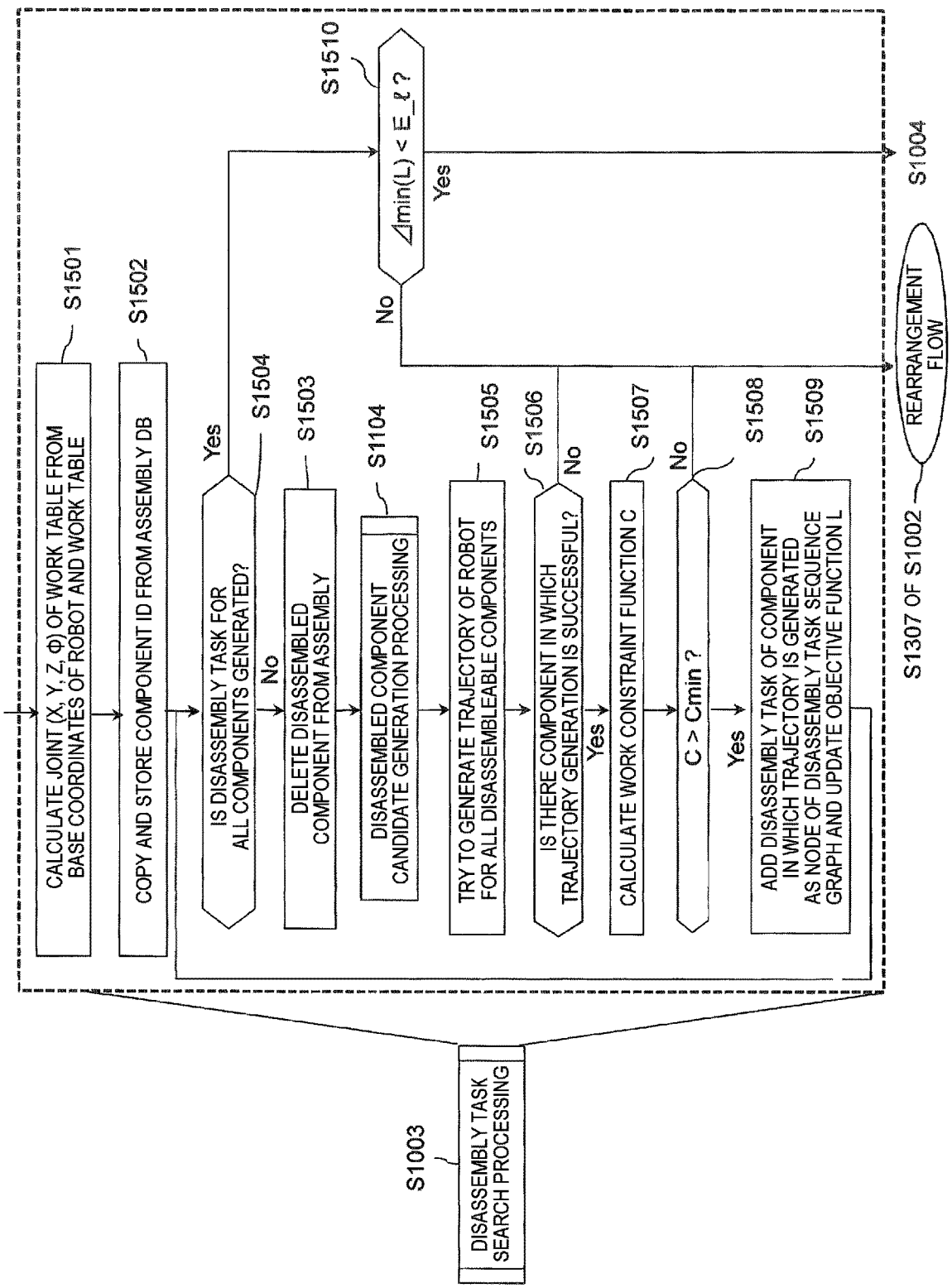
[FIG. 15]

[FIG. 16]
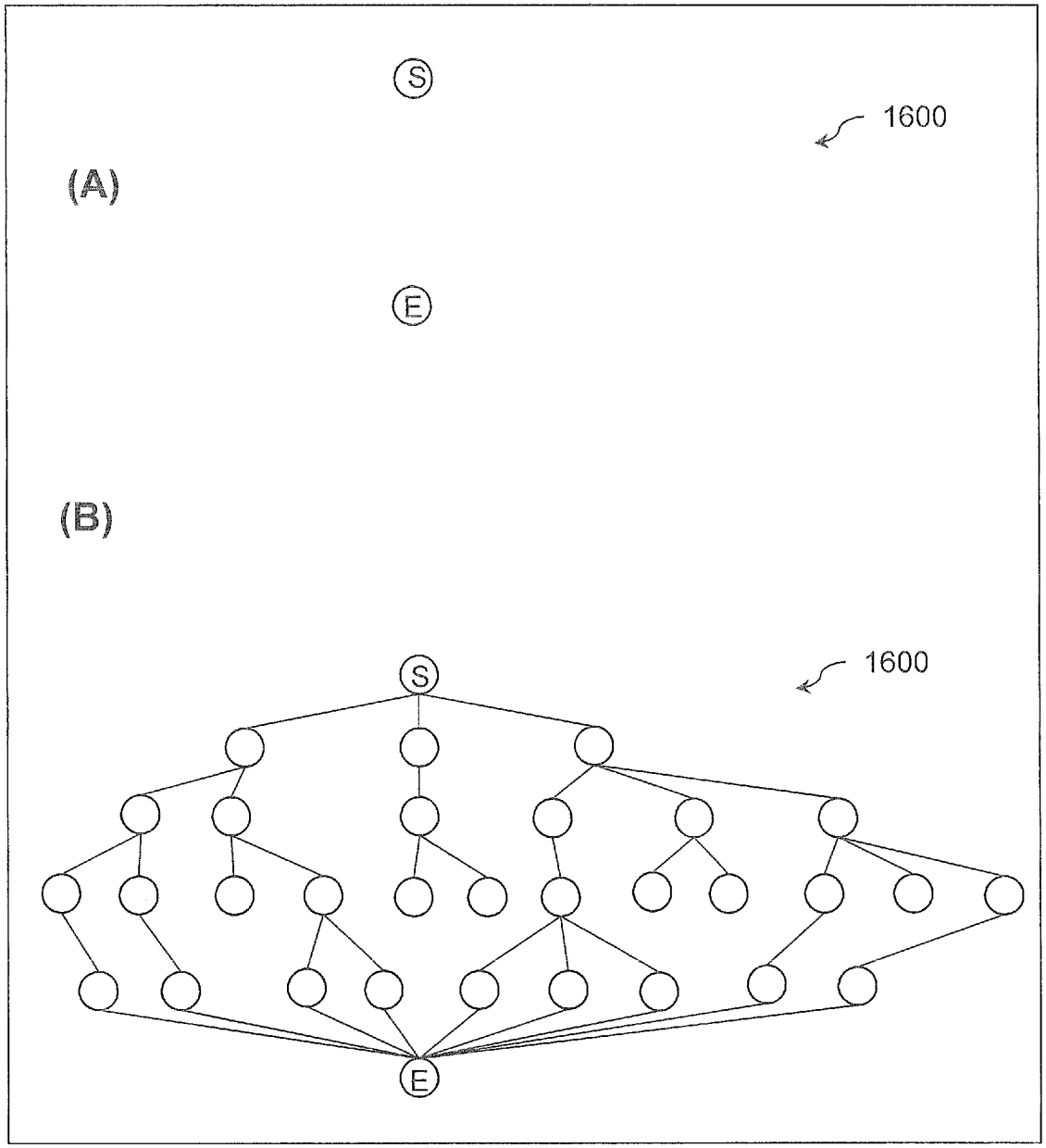

[FIG. 17]
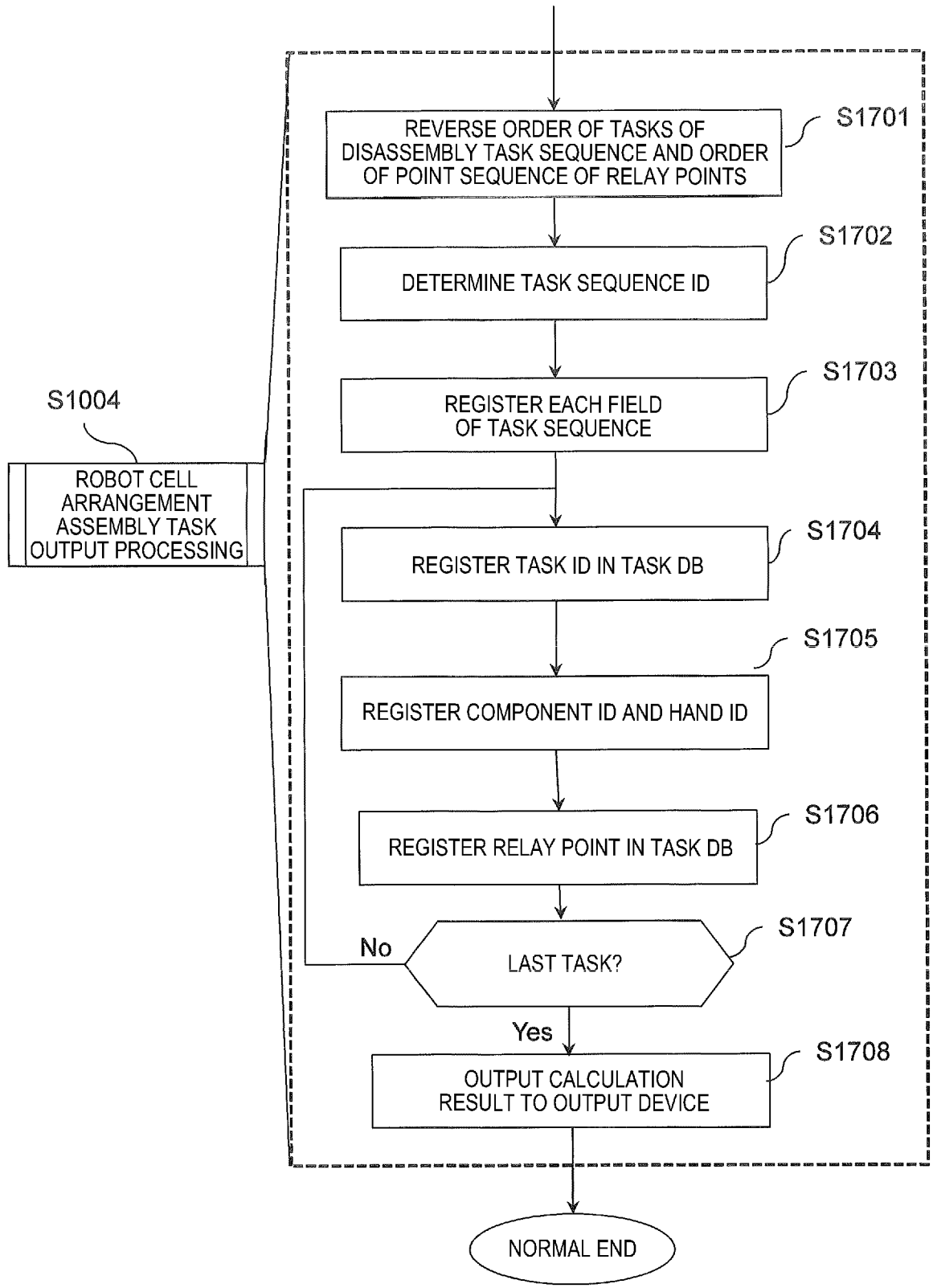

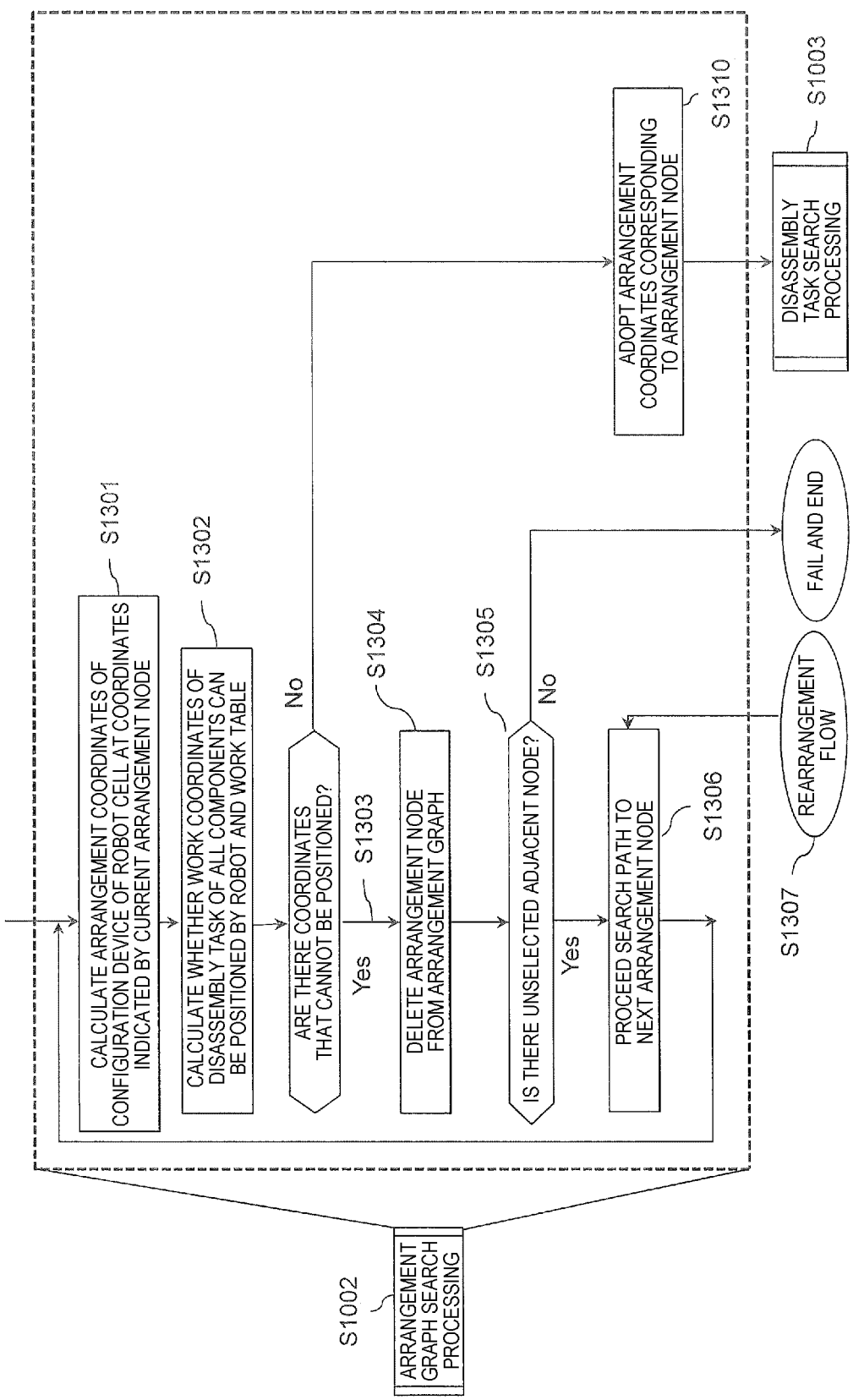
[FIG. 18]

PLANNING DEVICE, PLANNING METHOD, AND PLANNING PROGRAM

CLAIM OF PRIORITY

The present application claims priority from Japanese patent application JP 2020-149595 filed on Sep. 7, 2020, the content of which is hereby incorporated by reference into this application.

TECHNICAL FIELD

The present invention relates to a planning device, a planning method, and a planning program.

BACKGROUND ART

PTL 1 discloses a layout device for laying out a plurality of welding facilities in a welding line in consideration of a region occupied by a component supply device and a material can which are auxiliary facilities. The layout device executes processing of assigning the type and the number of components to be welded in the welding facilities in each step, processing of calculating a step region required for each step by changing a size of an auxiliary region occupied by the auxiliary facilities attached to the welding facilities in each step according to the type and the number of assigned components, and processing of virtually arranging the welding facilities in each step based on the calculated step region.

CITATION LIST

Patent Literature

PTL 1: JP-A-2006-26757
PTL 2: JP-A-2012-14569

SUMMARY OF INVENTION

Technical Problem

Regarding a layout of a robot cell, it is necessary to properly plan an arrangement of a robot for a product model that is an assembly. For example, it is not easy to plan a position-orientation relationship of a robot, a hand, and a product model in consideration of an operation range of a 6-axis arm robot. Therefore, every time the product model changes, a production engineer plans the arrangement, and the manufacturing preparation man-hours for physically adjusting positions between devices are required. Therefore, it is difficult to quickly respond to manufacturing preparations for different product models, resulting in specialized manufacturing facilities.

An object of the invention is to improve efficiency of an arrangement design of a robot cell and efficiency of a robot work.

Solution to Problem

A planning device, which is one aspect of the invention disclosed in the present application, includes: a processor configured to execute a program; and a storage device that stores the program, in which the planning device is configured to access to a database that stores, as three-dimensional data, positions, orientations, and shapes related to a work table including a positionable top plate, an assembly fixed on the top plate, a component tray for serving components that form the assembly, a robot capable of disassembling the assembly into a component group, a hand attached to a tip end of the robot, and a hand holder housing the hand, and the processor is configured to execute: first search processing of searching an arrangement graph, which is changed by positioning of the work table and shows candidates for relative positions and orientations between the robot and a fixture that fixes the assembly on the work table; second search processing of searching a disassembly task sequence, which is a series of disassembly tasks that are operations of a robot for disassembling the components from the assembly in an arrangement of the relative positions and orientations between the robot and the fixture on the work table found by the first search processing, and searching, based on a point sequence of positioning relay points of the robot shown by the disassembly tasks belonging to the disassembly task sequence, a trajectory of the robot in which the robot disassembles the components from the assembly; and first generation processing of generating assembly tasks formed of a point sequence obtained by reversing the point sequence of the relay points and an assembly trajectory of the robot which is a trajectory reverse to a disassembly trajectory formed of interpolation points between the point sequences, and an assembly sequence showing an order of the assembly tasks, which is a reverse order of the disassembly task sequence.

Advantageous Effect

According to a typical aspect of the invention, it is possible to improve the efficiency of preparation of a robot cell and the efficiency of a robot assembly work. Problems, configurations, and effects other than those described above will become apparent from the following description of embodiments.

BRIEF DESCRIPTION OF DRAWINGS

FIG. 1 is an illustration diagram showing an example of a robot cell represented by three-dimensional data.
FIG. 2 is a block diagram showing a hardware configuration example of a planning device.
FIG. 3 is an illustration diagram showing an example of a robot configuration DB.
FIG. 4 is an illustration diagram showing an example of a hand DB.
FIG. 5 is an illustration diagram showing an example of a hand holder DB.
FIG. 6 is an illustration diagram showing an example of a work table configuration DB.
FIG. 7 is an illustration diagram showing an example of an assembly DB.
FIG. 8 is an illustration diagram showing an example of a component DB.
FIG. 9 is an illustration diagram showing an example of an installation DB.
FIG. 10 is a flowchart showing a layout planning processing procedure example of the planning device.
FIG. 11 is an illustration diagram showing an example of an assembly task DB for registering an assembly task sequence which is output of preprocessing.
FIG. 12 is a flowchart showing a detailed processing procedure example of disassembled component candidate generation processing (step S1104).
FIG. 13 is a flowchart showing a detailed processing procedure example 1 of arrangement graph search processing (step S1002) shown in FIG. 10.

FIG. 14 is an illustration diagram showing an arrangement node.

FIG. 15 is a flowchart showing a detailed processing procedure example of disassembly task search processing (step S1003).

FIG. 16 is an illustration diagram showing an example of a disassembly task sequence graph.

FIG. 17 is a flowchart showing a detailed processing procedure example of robot cell arrangement assembly task output processing (step S1004).

FIG. 18 is a flowchart showing a detailed processing procedure example 2 of the arrangement graph search processing (step S1002) shown in FIG. 10.

DESCRIPTION OF EMBODIMENTS

First Embodiment

<Example of Three-Dimensional Data of Robot Cell>

FIG. 1 is an illustration diagram showing an example of a robot cell represented by three-dimensional data. A robot cell 100 includes a multi-axis arm type robot 101, hands H1 to H6 (indicated as hand H when hands H1 to H6 are not distinguished from each other), a hand holder 103, a worktable 104, a fixture 106, and a component tray 107.

In FIG. 1, when a global coordinate system 110 is stretched on an X axis, a Y axis, and a Z axis that are orthogonal to each other, a base coordinate system of a lower end surface of the robot 101 matches the global coordinate system 110. An XY plane is a plane stretched by the X axis and the Y axis. In FIG. 1, the Z axis shows a vertical direction.

The robot 101 is a work machine implemented by a multi-axis arm. In the example of FIG. 1, the robot 101 is a work machine having m (m is an integer of 2 or more, and m=5 in FIG. 1) joints J1 to Jm, m links L1 to Lm connecting the joints J1 to Jm, and a base portion 101A. The base portion 101A is fixed on an installation surface 120 of the robot cell 100. A center of a lower end surface of the base portion 101A is set to 0. When the joints J1 to Jm are not distinguished from each other, the joints J1 to Jm are simply referred to as a joint J. When the links L0 to Lm are not distinguished each other, the links L0 to Lm are simply referred to as a link L. A coordinate origin Σo of the work table 104 is set at a center of a base 104A of the work table 104.

In the present embodiment, continuous trajectory points P1 to Pn (n is an integer of 1 or more, and when P1 to Pn are not distinguished from each other, P1 to Pn are referred to as P) in the robot 101 are planned. The trajectory point P is trajectory information of relative six-dimensional positions and orientations of the hand H with respect to each joint Jm of the robot 101 and an effector of the robot 101, and positions and orientations of each of the links L1 to Lm and the hand H derived from a value of each of the joints J1 to Jm by coordinate transformation.

Further, a joint coordinate system of each joint Jm is a three-dimensional space stretched by an Xm axis, a Ym axis, and a Zm axis that are orthogonal to each other, with an origin Om as a position of the joint Jm.

The joint Jm rotates the link Lm or the hand H. Specifically, for example, the joint J1 rotates the link L1 around a Z axis of a robot origin coordinate system ΣO.

The joint J2 rotates the link L2 around an X1 axis. The joint J3 rotates the link L3 around a Z2 axis. The joint J4 rotates the link L4 around a Z3 axis. The joint J5 rotates the hand H1 attached to a tip end portion around an X4 axis.

The hand H1 is attached to the link Lm (L5 in FIG. 1) at a tip end of the robot 101, and can be exchanged to other hands H2 to H6. The hand H1 shown in FIG. 1 is a hand capable of gripping components. In addition, there are various hands H2 to H6 such as a hand that turns a screw and a hand for welding. In FIG. 1, six types of hands H1 to H6 are shown, but the invention is not limited to six types.

The hand holder 103 is a holder for housing an unused hand H. The hand holder 103 has housing destinations G1 to G6 for each of the hands H1 to H6. The hand holder 103 is placed at any position on the installation surface 120 of the robot cell.

The worktable 104 is a table for the robot 101 to perform work. The work table 104 includes the base 104A fixed to the installation surface 120 and a top plate 104B movably connected to the base 104A. The top plate 104B can be moved in the X direction, the Y direction, and the Z direction. Further, the top plate 104B can rotate around the Z axis.

The worktable 104 is a table for the robot 101 to perform an assembly work for an assembly 105. The work table 104 includes the base 104A fixed to the installation surface 120 and the top plate 104B connected to the base 104A. The top plate 104B can be moved in the X direction, the Y direction, and the Z direction. Further, the top plate 104B can rotate around the Z axis.

The fixture 106 is a jig for fixing the assembly 105. The fixture 106 is fixed at a predetermined position on a top plate surface 104C.

The component tray 107 is a placing region for placing a component group forming the assembly 105. The component tray 107 is fixed at any position in the robot cell.

The assembly 105 is a finished product assembled from the component group. The assembly 105 is fixed on the fixture 106. In the present embodiment, before assembling the assembly 105, a trajectory in which the robot 101 operates is calculated in advance by planning disassembly processing of removing the components from the assembly 105 and placing each component on the component tray 107, and assembly processing of assembling the assembly 105 is planned and executed by removing the components from the component tray 107 in a reverse order of the disassembly processing.

<Hardware Configuration Example of Planning Device>

FIG. 2 is a block diagram showing a hardware configuration example of a planning device. A planning device 200 includes a processor 201, a storage device 202, an input device 203, an output device 204, and a communication interface (communication IF) 205. The processor 201, the storage device 202, the input device 203, the output device 204, and the communication IF 205 are connected via a bus 206. The processor 201 controls the planning device 200. The storage device 202 is a work area of the processor 201. Further, the storage device 202 is a non-temporary or temporary recording medium that stores various programs and data. The storage device 202 is, for example, a read only memory (ROM), a random access memory (RAM), a hard disk drive (HDD), and a flash memory. The input device 203 inputs data. The input device 203 is, for example, a keyboard, a mouse, a touch panel, a numeric keypad, and a scanner. The output device 204 outputs data. The output device 204 is, for example, a display, a printer, and a speaker. The communication IF 205 is connected to a network, and transmits and receives data.

<Database>

Here, various databases (DB) stored in the storage device 202 will be described. The storage device 202 stores a robot configuration DB 211, a hand DB 212, a hand holder DB 213, a worktable configuration DB 214, an assembly DB 215, a component DB 216, an installation DB 217, and an assembly task DB 218.

FIG. 3 is an illustration diagram showing an example of the robot configuration DB 211. The robot configuration DB 211 is a database that stores data related to the joint J and the link L that form the robot 101. Specifically, the robot configuration DB 211 includes, for example, joint information DB 301, link information DB 302, and initial base coordinate system DB 305.

The joint information DB 301 is a database that stores information related to the joint J. Specifically, for example, the joint information DB 301 includes, as fields, a robot ID 304, a joint name 311, an operation type 312, a joint position and orientation 313, a rotation axis 314, an operation lower limit 315, an operation upper limit 316, a maximum speed 317, and a maximum acceleration 318 assigned to the individual robot 101. A combination of values of each of the fields in the same row forms one joint J.

The joint name 311 is a name that uniquely specifies the joint J. The operation type 312 indicates a type related to an operation of the joint J, such as rotation and translation. The joint position and orientation 313 of the joint Jm is an affine matrix Hm indicating a position and orientation of a joint coordinate system with respect to a previous joint J(m−1) in each joint coordinate system.

The rotation axis 314 indicates an axis around which the joint Jm can rotate in the joint coordinate system of the joint J(m−1) in a unit of a three-dimensional vector. In FIG. 3, the joint J1 rotates the link L1 around the Z axis of the robot origin coordinate system ΣO.

The operation lower limit 315 is a lower limit value at which the joint J can operate, the operation upper limit 316 is an upper limit value at which the joint J can operate, and the joint J can perform an operation shown in the operation type 312 in a range from the operation lower limit 315 to the operation upper limit 316.

The maximum speed 317 is a maximum value of an operation speed of the joint J. If the operation type 312 is "rotation", the operation speed is a rotation angular velocity. The maximum acceleration 318 is a maximum value of an operation acceleration of the joint J. If the operation type 312 is "rotation", the operation speed is a rotation angular acceleration.

The link information DB 302 is a database that stores information related to the link L. Specifically, for example, the link information DB 302 includes, as fields, the robot ID 304, a link name 321, a parent joint name 322, a child joint name 323, and a link shape 324 assigned to the individual robot. A combination of values of each of the fields in the same row defines the joint information of one link L.

The link name 321 is a name that uniquely specifies the link L. The parent joint name 322 is the joint name 311 of the joint J that operates the link L. The child joint name 323 is the joint name 311 of the joint J(m+1) connected to the link Lm. For example, in a case of the link L1, the parent joint name 322 is J1 and the child joint name 323 is J2.

The link shape 324 is an actual shape of the link L, and is, for example, solid data stored in a format such as standard for the exchange of product model data (STEP), or polygon data stored in a format such as stereolithography (STL).

The initial base coordinate system DB 305 stores, as fields, for example, the robot ID 304 assigned to the individual robot 101, and an initial value of a relative position and orientation of the base coordinate system of the robot 101 as seen from the global coordinate system on the robot cell installation surface 120 as initial base coordinates 303 in the affine matrix. In the case of the configuration of FIG. 1, since the global coordinate system matches a robot coordinate system, the initial base coordinates 303 are a 4×4 unit matrix.

FIG. 4 is an illustration diagram showing an example of the hand DB 212. The hand DB 212 is a database that stores information related to the hand H. The hand DB 212 includes a hand ID 401, a hand shape 402, and a housing destination ID 403. The hand ID 401 is identification information that uniquely specifies the hand H. The hand shape 402 is an actual shape of the hand H, and is, for example, solid data stored in a format such as STEP, or polygon data stored in a format such as STL. The hand shape 402 is connected to the link Lm connected thereto.

FIG. 5 is an illustration diagram showing an example of the hand holder DB 213. The hand holder DB 213 is a database that stores information related to the hand holder 103. The hand holder DB 213 includes a hand holder shape 501, the housing destination ID 403, a housing destination shape 502, and housing position coordinates 503. The hand holder shape 501 is an actual shape of the hand holder 103, and is, for example, solid data stored in a format such as STEP, or polygon data stored in a format such as STL. Hand attachment coordinates 404 indicate relative coordinates by an affine matrix when the hand H is attached to the effector of the robot 101.

The housing destination ID 403 is identification information that uniquely specifies the housing destination of the hand holder 103. The housing destination shape 502 is an actual shape of the housing destination G, and is, for example, solid data stored in a format such as STEP, or polygon data stored in a format such as STL. The housing position coordinate 503 indicates an affine matrix representing a relative position and orientation with respect to hand holder coordinates when the hand is housed in a housing destination Gm.

FIG. 6 is an illustration diagram showing an example of the work table configuration DB 214. The work table configuration DB 214 is a database that stores data related to joints X, Y, Z, Φ and links Lx, Ly, Lz, LΦ that form the work table 104. Specifically, for example, the work table configuration DB 214 includes a joint information DB 601, a link information DB 602, position information 603, and an initial base coordinate system DB 605.

The joint information DB 601 is a database that stores information related to the joints X, Y, Z, and Φ. Specifically, for example, the joint information DB 601 includes, as fields, a work table ID 604 that specifies an individual work table, a joint name 611, an operation type 612, a joint position and orientation 613, a rotation axis 614, an operation lower limit 615, an operation upper limit 616, a maximum speed 617, and a maximum acceleration 618. A combination of values of each of the fields in the same row forms one joint.

The joint name 611 is a name that uniquely specifies the joints X, Y, Z, and Φ. The operation type 612 indicates a type related to an operation of the joints X, Y, Z, and Φ, such as rotation and translation. The joint position and orientation 613 is an affine matrix Tj (j=X, Y, Z, Φ) indicating the position and orientation of the joint coordinate system with respect to the previous joint in each joint coordinate system.

The axis 614 indicates an axis around or along which the joint can rotate or translate in the joint coordinate system of the previous joint in a unit of a three-dimensional vector. In FIG. 6, the joint X translates the link Lx along the Zo axis of the coordinate origin Σo of the work table 104.

The operation lower limit 615 is a lower limit value at which each joint can operate, the operation upper limit 616 is an upper limit value at which each joint can operate, and each joint can perform an operation shown in the operation type 612 in a range from the operation lower limit 615 to the operation upper limit 616.

The maximum speed 617 is a maximum value of an operation speed of each joint. If the operation type 612 is "translation", the operation speed is a translation speed. The maximum acceleration 618 is a maximum value of an operation acceleration of each joint. If the operation type 612 is "translation", the operation speed is a translation acceleration.

The link information DB 602 is a database that stores information related to each link. Specifically, for example, the link information DB 602 includes, as fields, the worktable ID 604, a link name 621, a parent joint name 622, a child joint name 623, and a link shape 624 that specify an individual work table. A combination of values of each of the fields in the same row defines the joint information of one link.

The link name 621 is a name that uniquely specifies the link L. The parent joint name 622 is the joint name 611 of the joint that operates each link. The child joint name 623 is the joint name 611 of the joint J(m+1) connected to the link Lm. For example, in a case of link Lx, the parent joint name 622 is X and the child joint name 623 is Y.

The link shape 624 is an actual shape of each link, and is, for example, solid data stored in a format such as standard for the exchange of product model data (STEP), or polygon data stored in a format such as stereolithography (STL).

The initial base coordinate system DB 605 stores, as fields, for example, the work table ID 604 assigned to the individual work table 104 and the initial value 603 of the relative position and orientation between the base coordinate system of the work table 104 as seen from the robot coordinate system on the robot cell installation surface 120 in the affine matrix.

FIG. 7 is an illustration diagram showing an example of the assembly DB 215. The assembly DB 215 is a database that stores information related to the assembly 105. The assembly DB 215 includes an assembly ID 701, a component ID 702, and a base component ID 703. The assembly ID 701 is identification information that uniquely specifies the assembly 105. The component ID 702 is identification information that uniquely specifies a component that is an element of the assembly 105. The base component ID 703 is a component ID of the base component. The base component is a component that is first fixed to the fixture 106 when assembling the assembly 105 and to which other components are assembled. That is, it is the last component when disassembling the assembly 105.

FIG. 8 is an illustration diagram showing an example of the component DB 216. The component DB 216 is a database that stores information related to the component. The component DB 216 includes an assembly ID 800, a component ID 801, a component shape 802, component assembly coordinates 803, a component tray ID 804, an available hand ID 805, and grip coordinates 806. The component ID 801 is identification information that uniquely specifies the component. The component shape 802 is an actual shape of a component, and is, for example, solid data stored in a format such as STEP, or polygon data stored in a format such as STL.

The component assembly coordinates 803 are an affine matrix representing coordinates of a component during assembly. The component tray ID 804 is an ID indicating a supply position of a component when the components are picked up in the component tray 107. The available hand ID 805 is the hand ID 401 of the hand H that can handle components. The grip coordinates 806 are an affine matrix representing coordinates when the hand H grips the component.

FIG. 9 is an illustration diagram showing an example of the installation DB 217. The installation DB 217 is a database that stores information related to a structure installed on the robot cell 100. An entry 911 indicates the fixture 106 and an entry 912 indicates the component tray 107. The installation DB 217 includes an installation ID 901, an installation shape 902, a base coordinate system 903, a relative ID 904, and relative coordinates 905. The installation ID 901 is, for example, the fixture 106 or the component tray 107. The component shape 902 is an actual shape of a structure indicated by the installation ID 901, and is, for example, solid data stored in a format such as STEP, or polygon data stored in a format such as STL.

The base coordinate system 903 indicates base coordinates of an installation indicated by the installation ID 901 seen from global coordinates. The relative ID 904 indicates an ID of the relative coordinates 905 related to a work belonging to the installation, as seen from the base coordinates of the installation. The relative coordinates 905 represent relative coordinates corresponding to the relative ID 904 by an affine matrix. For example, in a case of the fixture 106, relative coordinates Hfb of a base component to be fixed are recorded. In a case of the component tray 107, coordinates Htr for arranging the individual component on the component tray 107 are recorded.

<Layout Planning Processing Procedure Example>

FIG. 10 is a flowchart showing a layout planning processing procedure example of the planning device 200. The planning device 200 executes DB data read (step S1000), arrangement graph generation (step S1001), arrangement graph search processing (step S1002), disassembly task search processing (step S1003), and robot cell arrangement assembly task output processing (step S1004). The DB data read processing (step S1000) is processing of reading data from the various DBs described above. The arrangement graph generation (step S1001) is generation of a graph using an arrangement plan of the robot 101 and the work table 104 as a node. The arrangement graph search processing (step S1002) is executed on the arrangement graph.

The arrangement graph search processing (step S1002) is processing of searching an arrangement graph using an arrangement plan of the robot 101 and the work table 104 as a node. Details of the arrangement graph search processing (step S1002) will be described later in FIGS. 13 and 14. The disassembly task search processing (step S1003) is processing of planning the disassembly task of the assembly 105 with respect to the arrangement plan of the robot 101 and the work table 104.

The disassembly task is an operation of the robot 101 to disassemble the components from the assembly 105. Specifically, for example, the disassembly task refers to a vector that enables disassembly without interfering with other components among vectors that define a disassembly direction for disassembling the components from the assembly 105 (a state in which some components have been removed by disassembly is also referred to as the "assembly 105", and the same applies to the following) and a movement amount in the disassembly direction.

When the disassembly task fails in the corresponding arrangement plan, the processing returns to the arrangement graph search processing (step S1002) (1005). Details of the disassembly task search processing (step S1003) will be described later in FIGS. 15 and 16. The robot cell arrangement assembly task output processing (step S1004) is processing of generating an assembly task sequence of the robot 101 from a disassembly task sequence that succeeds in the search. Details of the robot cell arrangement assembly task output processing (step S1004) will be described later with reference to FIG. 17.

The disassembly task sequence is a series of ordered disassembly tasks. The assembly task sequence is a series of ordered assembly tasks. The assembly tasks are formed of a point sequence obtained by reversing a point sequence of positioning relay points of the robot 101 indicated by the disassembly tasks.

<DB Data Read Processing>

The planning device 200 obtains data from each database of the storage device 202. The data to be obtained is information stored in the robot configuration DB 211, the hand DB 212, the hand holder DB 213, the work table configuration DB 214, the assembly DB 215, the component DB 216, and the installation DB 217. The planning device 200 executes the subsequent processing with the data as initial values. The initial base coordinates 303 of the robot 101 and the initial base coordinates 603 of the work table 104 are passed, to the arrangement graph search processing (step S1002), as coordinates of initial arrangements of the robot 101 and the work table 104. Next, the planning device 200 generates an arrangement graph.

<Arrangement Graph Generation>

The arrangement graph is a graph showing a relative position relationship between the robot 101 and the work table 104, and is formed of a set of nodes and a set of edges connecting the nodes. Each node of the arrangement graph represents a candidate for a base coordinate system Σf of the fixture 106 on the work table 104 as seen from the base coordinates of the robot 101. In a case of the example, a freedom degree of an arrangement of a fixture is four-dimensional, x, y, z, Φ, because the freedom degree is listed in a four-dimensional work table. (x, y, z, Φ) can be changed by a positioning operation of the work table 104, and a relative arrangement of the robot and the work table can be changed.

Adjacent nodes correspond to coordinates where each element in four dimensions is sampled with a constant step width. For example, a step width in the X direction is Δx, a step width in the Y direction is Δy, a step width in the Z direction is Δz, and a step width in a rotation angle Φ is Δθ. An adjacent node connected to a certain node (x, y, z, θ) by an edge is (x+Δx, y, z, θ), (x−Δx, y, z, θ), (x, y+Δy, z, θ), (x, y−Δy, z, θ), (x, y, z+Δz, θ), (x, y, z−Δz, θ), (x, y, z, θ+Δθ), or (x, y, z, θ−Δθ).

As a start node of the arrangement graph, the planning device 200 uses relative coordinates calculated based on the initial base coordinates 303 of the robot 101 obtained from the storage device 202, the initial base coordinates 603 of the work table 104, and the base coordinate system Σf of the fixture 106. The planning device 200 generates an arrangement graph using arrangement coordinates belonging to possible arrangement regions of the robot 101 and the work table 104 as nodes.

<Arrangement Graph Search Processing (Step S1002)>

FIG. 13 is a flowchart showing a detailed processing procedure example 1 of the arrangement graph search processing (step S1002) shown in FIG. 10. FIG. 14 is an illustration diagram showing the arrangement graph. In FIG. 14, for simplification of the description, elements of nodes (indicated by circles) that form an arrangement graph 1400 are two elements of an X axis value and a Y axis value, and the number of nodes is 16 nodes N11 to N44. Nodes are connected by edges (indicated by lines).

The planning device 200 calculates arrangement coordinates of the robot 101, the work table 104, the hand holder 103, each hand (H1 to H6), and the component tray 107 at coordinates indicated by an arrangement node that is a current search point (step S1301). In (A) of FIG. 14, an arrangement node corresponding to the arrangement coordinates calculated based on the initial base coordinates 303 of the robot, the initial base coordinates 603 of the work table 104, and the relative coordinates (905) of the fixture is defined as the node N22. An adjacent node of the node N22 is a node connected to the node N22 by an edge. In (A) of FIG. 14, the adjacent node of the node N22 is the node N12, N21, N23, or N32 connected to the node N22. The search for the arrangement node is processing of proceeding with the calculation shown in the arrangement graph search processing (step S1002) while advancing a search path from the start node to the adjacent arrangement node.

Next, the planning device 200 attempts to transform coordinates of the robot 101 and the work table 104 to the joint names 311 and 611 in order to confirm that all positioning coordinates required for the disassembly tasks of all the components forming the assembly 105 currently being disassembled can be positioned (step S1302).

Then, when the planning device 200 determines that there are positioning coordinates for which values of the joint names 311 and 611 cannot be calculated by the coordinate transformation (step S1303: Yes), the processing proceeds to step S1304, and when there is no disassembly task that cannot be removed (step S1303: No), the processing proceeds to step S1308.

In step S1304, the planning device 200 deletes the corresponding arrangement node from the arrangement graph 1400 (step S1304). For example, in (B) of FIG. 14, the arrangement node is N24. When there is at least one disassembly task that cannot be removed at coordinates of the arrangement node N24 (step S1303: Yes), the arrangement node N24 and an edge connected to the arrangement node N24 are deleted (indicated by a dotted line).

When all coordinates can be positioned (step S1303: No), the planning device 200 calculates an objective function F of the current arrangement node (step S1308). As a result, when ΔF, which is a difference from a previously calculated objective function value, is smaller than a threshold value E_f (step S1309: Yes), the planning device 200 adopts the current arrangement coordinates (step S1310) and proceeds to the disassembly task search processing (step S1003).

Further, after step S1304, the planning device 200 determines whether there is an unselected adjacent node in the arrangement node (step S1305). When there is an unselected adjacent node (step S1305: Yes), the search path proceeds to the next adjacent node (step S1306). The processing returns to step S1301. On the other hand, when there is no unselected adjacent node (step S1305: No), the arrangement graph search processing fails and ends. In step S1306, there is a flow that returns for rearrangement from the disassembly task search processing (step S1003) described later (step S1307).

The processing after step S1303: No will be specifically described. In step S1303, when there are no coordinates that cannot be positioned (step S1303: No), the planning device 200 calculates the objective function F of the arrangement graph search (step S1308). The objective function F of the arrangement graph search is a function for evaluating the maneuverability of the joint Jm and the link Lm forming the robot 101, and is calculated by, for example, the following Equations (1) to (7).

Specifically, one disassembly task is formed of n positioning operations. A series of disassembly tasks is called a disassembly task sequence DS. The disassembly task sequence DS is formed of ordered disassembly works from 1 to n. Specifically, since the order of the disassembly tasks has not been determined at the time of the arrangement graph search, the order of the disassembly tasks is the same as the order of the IDs of the components forming the assembly 105. Hi (i=1, . . . , m×n) is set to an affine matrix of a position and orientation of a tip end of a hand, which forms a certain disassembly task sequence DS.

Hereinafter, the joints of the robot 101 and the work table 104 are also referred to as joints. A joint value of the robot 101 is set to $\theta j$ (j is a variable of the jth joint, j=1, . . . , 6). The joint value $\theta j$ is one-dimensional, indicating a joint angle if the jth joint is a rotation joint, and indicating a distance if the jth joint is a translation joint. When a coordinate transformation matrix of the joint value $\theta j$ is set to $T(\theta j)$, and a coordinate transformation matrix from a joint value $\theta 6$ of the joint J6 to the tip end of the hand H is set to Th, Hi is represented by the following Equation (1).

$$Hi = T(\theta 1)T(\theta 2)T(\theta 3)T(\theta 4)T(\theta 5)T(\theta 6)Th \qquad (1)$$

Similarly, when the base coordinate system of the work table 104 as seen from the base coordinate system $\Sigma o$ of the robot 101 is set to Trt, and a coordinate transformation matrix $T(\alpha)$ ($\alpha$=X, Y, Z, $\Phi$) of joint values $\Phi$ (rotation angle around Z axis), X, Y, Z, which are parameters of the work table 104, and a coordinate transformation matrix to an assembly position and orientation on the assembly 105 as seen from the fixture 106 are set to Ta, Hi is represented by the following Equation (2). Here, the relative coordinates Hfb (905) on the fixture are indicated in a unit matrix.

$$Hi = TrtT(X)T(Y)T(Z)T(\Phi)TfTa \qquad (2)$$

Further, if inverse coordinate transformations of the robot 101 and the work table 104 are $Tr^{-1}$ (*) and $Tt^{-1}$ (*), respectively, the joint values of the robot 101 and the work table 104 are represented by the following Equations (3) and (4).

$$(\theta 1, \ldots , \theta 6)^T = Tr^{-1}(HiTh^{-1}) \qquad (3)$$

$$(X,Y,Z,\Phi)^T = Tt^{-1}(Trt^{-1}HiTa^{-1}Tf^{-1}) \qquad (4)$$

The objective function F of the arrangement graph search uses a specific weight sum of maneuverability F2 (Hi) of the robot 101 and a ratio F1 (Hi) of a deviation from a working region center value $\theta cj$ (j=1, . . . , 6, X, Y, Z, $\Phi$) of each joint value of the robot 101 and the work table 104 for Hi that forms the disassembly task sequence DS to a joint movement range [$\theta mj$, $\theta Mj$]. J ($\theta 1$, . . . , $\theta 6$) and J (X, Y, Z, $\Phi$) represent a Jacobian matrix of the robot 101 and a Jacobian matrix of the work table 104, respectively.

$$F1(Hi) = \beta 1 r1 + \ldots + \beta 6 r6 + \beta \Phi r\Phi + \beta xrx + \beta yry + \beta zrz \qquad (5)$$

$$rj = |\theta j - \theta cj|/(0.5|\theta Mj - \theta mj|)$$

$$(j=1, \ldots , 6, \Phi, x, y, z)$$

$$\beta 1 + \ldots + \beta 6 + \beta \Phi + \beta x + \beta y + \beta z = 1$$

$$F2(Hi) = \lambda 1 (\det J((\theta 1, \ldots , \theta 6)J^T(\theta 1, \ldots , \theta 6)))^{1/2} + \lambda 2 \\ (\det(J(X,Y,Z,\Phi)J^T(X,Y,Z,\Phi)))^{1/2} \qquad (6)$$

provided that $\lambda 1 + \lambda 2 = 1$

The objective function F(Hi) of the arrangement graph search is obtained by using Equations (5) and (6).

$$F(Hi) = \gamma 1 F1(Hi) + \gamma 2 F2(Hi) \qquad (7)$$

provided that $\gamma 1 + \gamma 2 = 1$

The planning device 200 determines whether $\Delta F < E\_f$ (step S1309). $\Delta F$ is a difference between a value of the objective function F (Hi) calculated last time and a value of the objective function F (Hi) calculated this time. E_f is a preset threshold value.

<Disassembly Task Search Processing (Step S1003)>

FIG. 15 is a flowchart showing a detailed processing procedure example of the disassembly task search processing (step S1003). FIG. 16 is an illustration diagram showing an example of a disassembly task sequence graph.

The planning device 200 calculates the joint coordinates 611 (X, Y, Z, $\Phi$) of the work table 104 based on the base coordinates of the robot 101 and the work table 104 corresponding to the arrangement node (step S1501). A position of the work table 104 is fixed to the calculated joint coordinates (X, Y, Z, $\Phi$) of the work table 104, and calculation processing for the subsequent disassembly task is performed.

When the relative coordinates of the arrangement node are (x, y, z, $\theta$), the joint coordinates (X, Y, Z, $\Phi$) of the worktable 104 use a calculated result by setting an orientation matrix, which is a 3×3 submatrix of Hi in Equation (4), as an orientation matrix when a rotation angle around the Zo axis of the robot base coordinate system $\Sigma O$ is $\theta$, setting a three-dimensional position vector in the 4-th column as an affine transformation matrix, that is, Trt(x, y, z)$^t$, and replacing the coordinate transformation matrix Ta for the assembly position and orientation on the assembly 105 with a 4×4 unit matrix.

Next, the planning device 200 copies and stores the component ID 702 from the assembly DB 215 (step S1502). When the disassembly task for all components have not been generated (step S1504: No), the processing proceeds to step S1503. When the disassembly task for all components have been generated (step S1504: Yes), the processing proceeds to step S1510. Step S1503 is processing of deleting disassembled components from the component ID stored in step S1502 and passing the component ID to the disassembled component candidate generation processing (step S1104). Here, details of the disassembled component candidate generation processing (step S1104) will be described with reference to FIG. 12.

<Disassembled Component Candidate Generation Processing (Step S1104)>

FIG. 12 is a flowchart showing a disassembled component candidate generation processing procedure example. First, the planning device 200 selects one component from the component ID 702 of the assembly 105 being disassembled (step S1201). Then, the planning device 200 specifies a geometrical constraint relationship between the selected component and another component (step S1202), and calculates a disassembly vector of the selected component (step S1203).

The geometric constraint relationship means that there is a geometric constraint relationship between the selected component and another component that come into contact with each other on a cylindrical surface or a flat surface. A freedom degree of a movement between the components that have a geometric constraint relationship is obtained and used as the disassembly vector. Two components that come into contact with each other on the flat surface are said to "have flat a surface constraint". Further, two components that come into contact with each other on the cylindrical surface are said to "have a cylindrical constraint". A possible movement vector is calculated by combining these constraint surfaces. The movement vector is called the disassembly vector.

The disassembly vector can be calculated by, for example, a known calculation method disclosed in PTL 2. For example, there are cylindrical constraint and flat surface constraint between screws and fastened components thereof. The screws may be threaded in a CAD model. In this case, since the thread is added to the cylindrical surface as a feature, the cylindrical surface can be extracted from the CAD model, and a cylindrical constraint relationship can be specified.

Next, the planning device 200 determines whether the selected component has a disassembly vector (step S1204). At that time, whether the selected component interferes with an undisassembled component assembled to the assembly 105 is not determined in the processing. The interference determination is executed in the disassembly task search processing (step S1003) that generates an operation of the robot 101.

When there is no disassembly vector (step S1204: No), the processing proceeds to step S1206. When there is a disassembly vector (step S1204: Yes), the processing proceeds to step S1205. In step S1205, the planning device 200 stores the selected component and the disassembly vector (step S1205). When a trial is not ended for all component IDs 702 of the assembly (step S1206: No), the processing returns to step S1201. When the trial is ended for all component IDs 702 of the assembly (step S1206: Yes), the disassembled component candidate processing (step S1104) is ended, and all the stored disassembled components and disassembled vectors are passed to the processing of step S1505 in FIG. 15.

The processing returns to FIG. 15, the planning device 200 tries to generate a trajectory of the robot 101 using positioning coordinates required for the disassembly task as a relay point for all the stored disassembled components and disassembly vectors (step S1505). Here, the relay point is a combination of the housing position coordinates 503 of a hand specified from the available hand ID 805 of the hand for gripping the disassembled components, hand housing approach coordinates translated by an approach vector 504 from the above coordinates, TpHtri (i=1, 2 . . . ) showing the relative coordinates 905 of the component tray 107, component tray approach coordinates translated by an approach vector 906 from the above coordinates, component assembly coordinates TfHftbTrj (j=1, 2 . . . ) on the assembly, and component approach coordinates translated by a length of a component projected in a disassembly vector direction. The planning device 200 generates the trajectory of the robot 101 using these coordinates ordered along a series of works as relay points. The trajectory of the robot 101 is a position and orientation as a rigid body obtained by coordinate-transforming a value of each joint Jm (311) and the link shape 324 of the link Lm (321) derived from Equation (1) at predetermined time intervals between the relay points.

The planning device 200 determines whether the trajectory generation in step S1505 is successful (step S1506). Here, success means that the robot 101 does not interfere with other assembled components, the work table 104, the fixtures 106, the hand holder 103, a hand placed on the hand holder 103, the component tray 107, and a component placed on the component tray 107, the component is disassembled from the assembly 105 within a movement range of the joint Jm (within a section of 315 to 316), and a disassembly trajectory in which the component is arranged on the component tray 107 is generated.

When the trajectory generation is successful (step S1506: Yes), the planning device 200 calculates a work constraint function C for coordinates on the trajectory (step S1507). The work constraint function C is a function for evaluating the disassembly trajectory based on a distance between the robot 101 and a standing position of a worker located around the work table 104, and is calculated according to, for example, the following Equation (8) based on a sum of distances from a standing position pw of the worker to a position pj (j=1, . . . , 6) of a link tip end of the robot 101, a tip end position Ph of the hand, and an assembly position pa on the work table 104.

$$C(Hi)=|p1-pw|+ \ldots +|p6-pw|+|ph-pw|+|pa-pw| \quad (8)$$

$$pj=T(\theta1) \ldots T(\theta j)(0001)^T, (j=1,\ldots,6)$$

$$ph=Hi(0001)^T$$

$$pa=TrtT(x)T(y)T(z)T(\Phi)Tf\,Hfb\,Ta(0001)^T$$

After the calculation of the work constraint function C (step S1507), the planning device 200 determines whether a calculation result C of the work constraint function C is larger than a threshold value C min (step S1508). When C>Cmin is not satisfied (step S1508: No), it is assumed that the work constraint is not satisfied, and in order to update the arrangements of the robot 101 and the work table 104, the processing returns to the rearrangement flow (step S1307) of the arrangement graph search processing (step S1002). On the other hand, when C>Cmin (step S1508: Yes), the planning device 200 adds a selected disassembly task to a node of a disassembly task sequence graph 1600, updates an objective function L (step S1509), and returns to step S1504.

FIG. 16 is an illustration diagram showing an example of the disassembly task sequence graph. (A) of FIG. 16 shows an initial state of the disassembly task sequence graph 1600 set in step S1103. S is a start node (empty node), and E is an endpoint node (base component). When the disassembly task is added as a node (a circle in FIG. 16) to the disassembly task sequence graph 1600, as shown in (B) of FIG. 16, the disassembly task sequence graph 1600 grows, and finally some paths reach the disassembly of the base component, and the generation of the disassembly task sequence graph 1600 ends. The path to the disassembly task of the base component is the successful generation of the disassembly task sequence DS.

The objective function L of the disassembly task sequence graph search is a function for calculating an operation time of the robot 101 required to disassemble all the components. The objective function L of the disassembly task sequence graph search is represented by the following Equation (9) as a sum of working times time(Dk) of individual disassembly tasks Dk (k=1, . . . , n) of the disassembly task sequence DS.

$$L(DS)=\text{time}(D1)+ \ldots +\text{time}(Dn) \quad (9)$$

The working time time(Dk) is calculated based on each joint trajectory of the robot 101 generated in step S1505, and the maximum speed 317 and the maximum acceleration 318 of the joint Jm. Further, in step S1506, when the trajectory generation fails (step S1506: No), in order to update the arrangements of the robot 101 and the work table 104, the processing returns to the rearrangement flow (step S1307) of the arrangement graph search processing (step S1002).

In step S1504, when the disassembly task of all the components is generated (step S1504: Yes), the planning device 200 determines whether a difference Δmin(L)

between a minimum value min(L) of L in the disassembly task sequence DS and a minimum value in previous arrangements of the robot 101 and the work table 104 is smaller than a threshold value E_1 (step S1510). When Δmin(L)<E_1 is not (step S1510: No), in order to update the arrangement of the robot and the work table, the processing returns to the rearrangement flow (step S1307) of the arrangement graph search processing (step S1002).

On the other hand, when Δmin(L)<E_1 (step S1510: Yes), the disassembly task sequence DS is successfully generated, and the processing proceeds to the robot cell arrangement assembly task output processing (step S1004).

<Robot Cell Arrangement Assembly Task Output Processing (Step S1004)>

FIG. 17 is a flowchart showing a detailed processing procedure example of the robot cell arrangement assembly task output processing (step S1004). The planning device 200 outputs relative arrangement information and the assembly task sequence of the robot 101 and the work table 104 to the assembly task DB 218 shown in FIG. 11 by the robot cell arrangement assembly task output processing (step S1004) in FIG. 17.

First, the planning device 200 reverses an order of tasks of the generated disassembly task sequence and generates an assembly task sequence (step S1701). At this time, an order of a point sequence of relay points of a robot trajectory of each task is also reversed.

Next, the planning device 200 uniquely determines a task sequence ID for the generated assembly task sequence (step S1702), and registers each field of the task sequence (step S1703). Specifically, for example, the planning device 200 registers, in a task sequence DB 1101 of the assembly task DB 218, a task sequence ID 1111, a robot ID 1112, a work table ID 1113, robot work table relative coordinates 1114, an assembly ID 1115, a lead time 1116, a work constraint value 1117, and robot maneuverability 1118.

Here, the robot ID 1112 corresponds to the robot ID 304 of the robot configuration DB of the robot used when the disassembly task sequence is output. The work table ID 1113 corresponds to the work table ID 604 of the work table DB used when the disassembly task sequence is output. The assembly ID 1115 corresponds to the assembly ID 701 of the assembly DB used when the disassembly task sequence is output.

The lead time 1116 is a value of the objective function L calculated in step S1509 of the disassembly task search processing (step S1003) stored in the case of Yes in step S1508 when the disassembly task sequence is output. The work constraint value 1117 is a value of the work constraint function C calculated in step S1507 of the disassembly task search processing (step S1003) stored in the case of Yes in step S1506 when the disassembly task sequence is output. The robot maneuverability 1118 is a value of the objective function F calculated in step S1308 of the arrangement graph search processing (step S1002) stored in the case of No in step S1303.

Next, the planning device 200 registers the task sequence ID 1111 in a task DB 1102 according to a sequence order for each task in the assembly task sequence (step S1704). After that, the planning device 200 registers a task ID 1122 in step S1704 and registers a component ID 1123 and a hand ID 1124 for each task (step S1705).

After that, the planning device 200 registers hand housing approach coordinates 1125, hand housing coordinates 1126, component tray approach coordinates 1127, component tray coordinates 1128, component assembly approach coordinates 1129, and component assembly coordinates 1130, which belong to a point sequence of relay points (step S1706).

Then, the planning device 200 determines whether the last task is registered (step S1707). When the last task is not registered (step S1707: No), the processing returns to step S1704. When the last task is registered (step S1707: Yes), data of each field registered in the assembly task DB 218 is displayed on the output device 204 (step S1708), and the processing ends normally.

As described above, according to the present embodiment, a manufacturing preparation period can be shortened. Further, since a layout of the robot cell 100 can be executed for each assembly 105, one robot cell 100 can handle different assemblies. Therefore, it is possible to reduce facility investment cost when introducing the robot cell 100. Further, the generated assembly trajectory is an efficient trajectory with a shortened lead time in which the robot 101 does not interfere with other components or the hand holder 103 and an operation of the component between the assembly 105 and the component tray 107 is guaranteed within the movement range of the joint Jm.

[Modification]

<Another Example of Arrangement Graph 1400>

In the arrangement graph 1400 described above, the planning device 200 defines a relative position between the robot 101 and the work table 104. Alternatively, a relative position between the hand holder 103 and the robot 101 and a relative position between the component tray 107 and the robot 101 may be added to the node of the arrangement graph 1400.

In this case, a combination of the relative position between the robot 101 and the work table 104, the relative position between the hand holder 103 and the robot 101, and the relative position between the component tray 107 and the robot 101 is the node of the arrangement graph 1400.

Accordingly, it is possible to formulate a layout plan in consideration of the relative position between the hand holder 103 and the robot 101, the relative position between the component tray 107 and the robot 101, and the trajectory of the robot 101.

<Another Example of Arrangement Graph Search Processing (Step S1002)>

FIG. 18 is a flowchart showing a detailed processing procedure example 2 of the arrangement graph search processing (step S1002) shown in FIG. 13. A difference from FIG. 13 is that steps S1308 and S1309 are not executed in FIG. 18. Accordingly, the arrangement graph search processing (step S1002) can be speeded up. In FIG. 18, an example in which the objective function F of the arrangement graph search is not calculated is described, but the work constraint function C or the objective function L of the disassembly order graph search in FIG. 15 may not be calculated.

The invention is not limited to the above-described embodiments and includes various modifications and equivalent configurations within the spirit of the claims. For example, the embodiments described above have been described in detail for easy understanding of the invention, and the invention is not necessarily limited to those having all the configurations described above. A part of a configuration of a certain embodiment may be replaced with a configuration of another embodiment. A configuration of another embodiment may be added to a configuration of a certain embodiment. Further, another configuration may be added to, subtracted from or replaced with a part of a configuration of each embodiment.

Further, parts or all of the configurations, functions, processing units, processing methods described above and the like may be implemented by hardware, for example by designing with an integrated circuit, or may be implemented by software, with the processor 201 to interpret and execute a program that implements each function.

Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and information lines according to the embodiments described above indicate what is considered necessary for description, and not all the control lines and the information lines are necessarily shown in a product. In practice, it may be considered that almost all the configurations are connected with each other.

REFERENCE SIGN LIST

- 100: robot cell
- 101: robot
- 103: hand holder
- 104: work table
- 104B: top plate
- 105: assembly
- 106: fixture
- 107: component tray
- 200: planning device
- 201: processor
- 202: storage device
- 204: output device
- 211: robot configuration DB
- 212: hand DB
- 213: hand holder DB
- 214: work table configuration DB
- 215: assembly DB
- 216: component DB
- 217: installation DB
- 218: assembly task DB
- 1400: arrangement graph
- 1600: disassembly task sequence graph
- H: hand

The invention claimed is:

1. A planning device, comprising:
   a processor configured to execute a program; and
   a storage device that stores the program, that when executed by the processor configures the processor to:
   access a database that stores, as three-dimensional data, positions, orientations, and shapes related to a work table including a positionable top plate, an assembly fixed on the top plate, a component tray for serving components that form the assembly, a robot capable of disassembling the assembly into a component group, a first hand attached to a tip end of the robot, and a hand holder housing one or more second hands,
   execute a first search process of searching an arrangement graph, which is changed by positioning of the work table and shows candidates for relative positions and orientations between the robot and a fixture that fixes the assembly on the work table,
   execute a second search process of a disassembly task sequence, which is a series of disassembly tasks that are operations of the robot for disassembling the components from the assembly in an arrangement of the relative positions and orientations between the robot and the fixture on the work table found by the first search of the arrangement graph, and searching for, based on a point sequence of positioning relay points of the robot shown by the disassembly tasks belonging to the disassembly task sequence, a trajectory of the robot in which the robot disassembles the components from the assembly, and
   execute a first generation process of generating assembly tasks formed of a point sequence obtained by reversing the point sequence of the relay points, an assembly trajectory of the robot which is a trajectory reverse to a disassembly trajectory formed of interpolation points between the point sequences, and an assembly sequence showing an order of the assembly tasks, which is a reverse order of the disassembly task sequence,
   wherein the robot is a multi-axis arm having a plurality of links and the first hand is attached to a first link among the plurality of links,
   wherein the database stores, as the three dimensional data, link shape data of the plurality links, hand shape data of the first hand and the one or more second hands and hand holder housing shape data, and
   wherein the link shape data, hand shape data and hand holder housing shape data are each stored as stereolithography data or Standard for the Exchange of Product Model Data (STEP), which is read by the processor.

2. The planning device according to claim 1, wherein the processor is configured to, in the first search process, search the arrangement graph, based on a first objective function for evaluating maneuverability of the robot, for an arrangement of the relative positions and orientations between the robot capable of disassembling the components from the assembly and the fixture on the work table.

3. The planning device according to claim 1, wherein the processor is configured to, in the second search process determine, based on a second objective function for evaluating the disassembly trajectory according to a distance between the robot and a worker, whether to add, as a candidate, an arrangement of the relative positions and orientations between the robot and the fixture on the work table on the arrangement graph.

4. The planning device according to claim 1, wherein the processor is configured to, in the second search process, search the disassembly task sequence based on a third objective function for evaluating a working time of a disassembly work according to the disassembly task sequence.

5. The planning device according to claim 3, wherein the processor is configured to, in the second search process, search the disassembly task sequence based on a third objective function for evaluating a working time of a disassembly work according to the disassembly task sequence.

6. The planning device according to claim 1, wherein the database stores, as three-dimensional data, positions, orientations, and shapes related to the hand holder for removably housing the one or more second hands and the component tray,
   wherein the processor is configured to:
   execute a second generation process of generating an arrangement graph, which is changed by a positioning operation of the work table and shows candidates for relative positions and orientations between the work table and the robot, between the robot and the hand holder, and between the robot and the component tray, and in the first search process, search the arrangement graph generated by the second generation processing.

7. A planning method executed by a planning device including a processor configured to execute a program and a storage device that stores the program, the planning method comprising:

accessing a database that stores, as three-dimensional data, positions, orientations, and shapes related to a work table including a positionable top plate, an assembly fixed on the top plate, a component tray for serving components that form the assembly, a robot capable of disassembling the assembly into a component group, a first hand attached to a tip end of the robot, and a hand holder housing one or more second hands, first search processing of searching an arrangement graph, which is changed by positioning of the work table and shows candidates for relative positions and orientations between the robot and a fixture that fixes the assembly on the work table;

second search processing of searching a disassembly task sequence, which is a series of disassembly tasks that are operations of the robot for disassembling the components from the assembly in an arrangement of the relative positions and orientations between the robot and the fixture on the work table found by the first search processing of the arrangement graph, and searching for, based on a point sequence of positioning relay points of the robot shown by the disassembly tasks belonging to the disassembly task sequence, a trajectory of the robot in which the robot disassembles the components from the assembly; and first generation processing of generating assembly tasks formed of a point sequence obtained by reversing the point sequence of the relay points, an assembly trajectory of the robot which is a trajectory reverse to a disassembly trajectory formed of interpolation points between the point sequences, and an assembly sequence showing an order of the assembly tasks, which is a reverse order of the disassembly task sequence, wherein the robot is a multi-axis arm having a plurality of links and the first hand is attached to a first link among the plurality of links, wherein the database stores, as the three dimensional data, link shape data of the plurality links, hand shape data of the first hand and the one or more second hands and hand holder housing shape data, and wherein the link shape data, hand shape data and hand holder housing shape data are each stored as stereolithography data or Standard for the Exchange of Product Model Data (STEP), which is read by the processor.

8. A planning program stored on a non-transitory computer readable medium that, when executed by a processor, configures the processor execute steps comprising:

accessing a database that stores, as three-dimensional data, positions, orientations, and shapes related to a work table including a positionable top plate, an assembly fixed on a fixture on the top plate, a robot capable of disassembling the assembly into a component group, a first hand attached to a tip end of the robot, and a hand holder housing one or more second hands;

first search processing of searching an arrangement graph, which is changed by positioning of the work table and shows candidates for relative positions and orientations between the robot and a fixture that fixes the assembly on the work table;

second search processing of searching a disassembly task sequence, which is a series of disassembly tasks that are operations of the robot for disassembling the components from the assembly in an arrangement of the relative positions and orientations between the robot and the fixture on the work table found by the first search processing of the arrangement graph, and searching for, based on a point sequence of positioning relay points of the robot shown by the disassembly tasks belonging to the disassembly task sequence, a trajectory of the robot in which the robot disassembles the components from the assembly; and first generation processing of generating assembly tasks formed of a point sequence obtained by reversing the point sequence of the relay points, an assembly trajectory of the robot which is a trajectory reverse to a disassembly trajectory formed of interpolation points between the point sequences, and an assembly sequence showing an order of the assembly tasks, which is a reverse order of the disassembly task sequence, wherein the robot is a multi-axis arm having a plurality of links and the first hand is attached to a first link among the plurality of links, wherein the database stores, as the three dimensional data, link shape data of the plurality links, hand shape data of the first hand and the one or more second hands and hand holder housing shape data, and wherein the link shape data, hand shape data and hand holder housing shape data are each stored as stereolithography data or Standard for the Exchange of Product Model Data (STEP), which is read by the processor.

* * * * *